(12) United States Patent
Sinnard et al.

(10) Patent No.: US 7,733,351 B1
(45) Date of Patent: Jun. 8, 2010

(54) METHOD FOR FORMING AN INTERACTIVE IMAGE OF INDOOR AND OUTDOOR SPACES

(75) Inventors: Judith Sinnard, 3503 Cactus Creek Dr., Spring, TX (US) 77386; Marjorie Sinnard, Webster, TX (US)

(73) Assignee: Judith Sinnard, Spring, TX (US)

( * ) Notice: Subject to any disclaimer, the term of this patent is extended or adjusted under 35 U.S.C. 154(b) by 342 days.

(21) Appl. No.: 12/021,970

(22) Filed: Jan. 29, 2008

Related U.S. Application Data

(60) Provisional application No. 60/888,428, filed on Feb. 6, 2007.

(51) Int. Cl.
*G09G 5/00* (2006.01)
(52) U.S. Cl. ...................... 345/582; 345/619
(58) Field of Classification Search ............... 345/581, 345/582, 619, 660
See application file for complete search history.

(56) References Cited

U.S. PATENT DOCUMENTS

| 5,650,800 | A  | * | 7/1997  | Benson  ................... 345/173 |
| 6,556,211 | B2 | * | 4/2003  | Davis  ..................... 345/582 |
| 7,277,572 | B2 | * | 10/2007 | MacInnes et al. ........... 382/154 |
| 7,574,323 | B2 | * | 8/2009  | Rappaport et al. .......... 702/182 |

* cited by examiner

*Primary Examiner*—Ryan R Yang
(74) *Attorney, Agent, or Firm*—Buskop Law Group, PC; Wendy Buskop

(57) ABSTRACT

A method for forming an interactive image of a property comprising determining at least a first measurement of a space within the property forming at least one measurement line, inputting the at least first measurement to a processor, and inputting textual information and at least one graphic image concerning the space to the processor. A property overview image is then formed using computer instructions, the at least first measurement, the at least one measurement line, the textual information, and the at least one graphic image. The property overview image is then output for viewing by a user.

20 Claims, 9 Drawing Sheets

Figure 9

350 — SAMPLE – Amenities List & Printable Floor Plan | 310a—Return to Floor Plan

PROPERTY PROFILE—352

- 3,438 sq ft Home (per HCAD)
- 790 sq ft Pool House (per HCAD)
- Home built in 1989 (per HCAD)
- Pool House built in 2000 (per HCAD) —73
- 15,000 sq ft Lot (per HCAD)

FIRST FLOOR—355
360a

FOYER/ENTRY | 8' x 10' 1" |—330a —72a

- 8' stained wood door with glass beveled accent panels and beveled glass sidelights
- Custom stained and painted hardwood floor by Decorative Arts, Inc.
- Stairway with hardwood treads and custom wrought iron & gold leaf balustrade with wood rail
- Hall Closet
- Multi-piece crown molding
- PAR 38 directional recessed lighting
- Double French pocket door to Family Room 360b

LIVING ROOM | 13' 5" x 17' |—330b —72b

- Windows with plantation shutters
- Cased opening to Entry Foyer
- Multi-piece crown molding
- PAR 38 directional recessed lighting and recessed directional halogen spotlights
- Built-in speakers with volume control 360c

KITCHEN – | 11' 5" x 10' 7" |—330c —72c

- Stainless double sink with GROHE single lever fixture set in slab granite counter with slab granite backsplash
- Custom cabinets with wrought iron Pulls, tray storage, full extension pull-out pan drawers, lazy Susan corner storage unit
- Stained alder island with slab granite top, cabinet access from two sides, and built-in appliance barn
- Two compartment trash drawer
- DACOR Microwave
- DACOR self cleaning Oven
- DACOR Warming Drawer
- GE Profile Performance stainless, counter depth refrigerator/freezer
- DACOR 4-burner gas cooktop with DACOR retractable vent
- BOSCH stainless steel Dishwasher
- Walk-in Pantry with wrap-around shelving
- Decorative wallpaper
- Under cabinet lighting
- PAR 38 directional recessed lighting 360d

BREAKFAST – | 14' x 8' 2" |—330d —72d

- Bay window, with V-Kool 70 coating, alcove with custom upholstered banquette seating
- Roman shades
- Decorative wallpaper
- PAR 38 directional recessed lighting 310b—Return to Floor Plan

METHOD FOR FORMING AN INTERACTIVE IMAGE OF INDOOR AND OUTDOOR SPACES

CROSS REFERENCE TO RELATED APPLICATIONS

The present application claims priority to U.S. Provisional Patent Application Ser. No. 60/888,428 filed on Feb. 6, 2007, the entirety of which is incorporated herein by reference.

FIELD

The present embodiments relate to a method for forming an interactive image of a space, such as a ranch, a resort property, a golf course, and other similar tracts of land.

BACKGROUND

A need exists for a method for forming an interactive image of a space, which can be a property including one or more structures or outside spaces, that compiles an interactive property overview image for land and structures within a property, a listing of features for the property, and one or more digital images of selected interior and exterior views of structures and outside spaces, into a single file, allowing a user to individually or simultaneously access floor plans of structures, birds-eye views and/or satellite images of land, the text information, and the one or more digital images. A property overview image can include one or more floor plan images of one or more structures, combined with depictions of outdoor land, spaces, features, and structures. Acreage plans can include multiple nested or embedded floor plans.

A further need exists for method for forming an interactive image of a property that incorporates accurate on-site measurements for one or more rooms of a structure or one or more dimensions of an outside space or geographical feature, records such measurements within a file relating to the property, and produces a property overview image that is drawn to scale, using one or more measurement lines representative of actual on-site measurements.

A need exists for method that produces graphical images that correspond to interior details of a property, such as the inside of closets, cabinetry, appliances, ceiling lines and features, roof lines and features, windows, flooring, and attics, and graphical images that correspond to outdoor details of a property, such as the locations and dimensions of trees, outdoor structures, lakes, farmland, fences, and other similar manmade and geographical outdoor features.

A further need exists for a method that produces rooms and outside spaces drawn to scale, graphic images representing indoor and outdoor features, annotated text information labeling and describing features, and optionally, icons for linking to digital images, in a single property overview image, providing a seamless, integrated product for use by property buyers, sellers, and real estate agents.

The present embodiments meet these needs.

BRIEF DESCRIPTION OF THE DRAWINGS

The detailed description will be better understood in conjunction with the accompanying drawings as follows:

FIG. 9 depicts an embodiment of a portion of a textual features listing relating to a structure.

Figure 1:
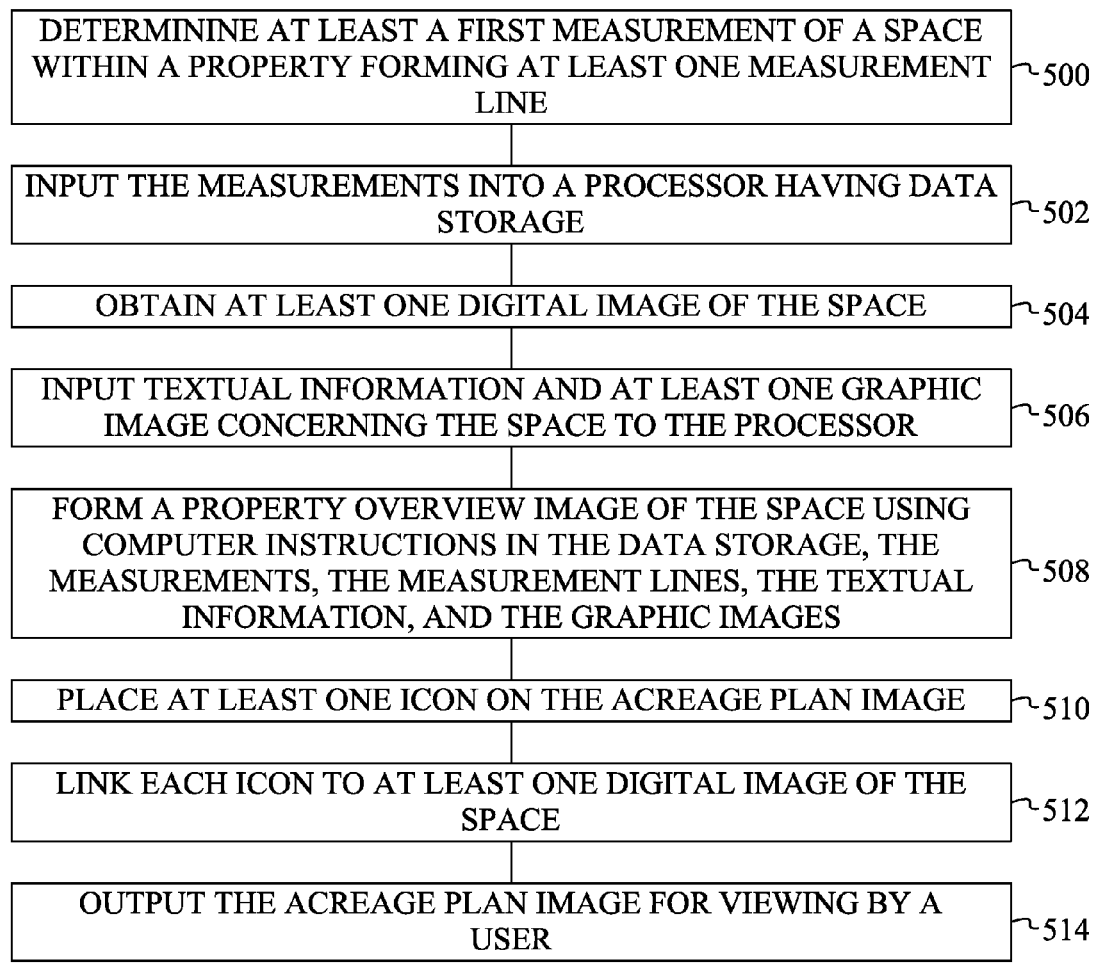
FIG. 1 depicts a flow diagram of an embodiment of the present method.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a method for forming an interactive image of a property. A property can include any contiguous or non-contiguous tracts of land, which can contain structures, landscaping, geographical features, and other similar indoor and outdoor spaces.

The present method includes collecting on-site, contemporaneous measurements of one or more spaces within the property, which can include rooms in a structure, outdoor spaces such as pastures, farmland, or lakes, and outdoor structures such as sheds, barns, paddocks, livestock enclosures, pool houses, fences, and billboards. The on-site, contemporaneous measurements of the present method provide numerous advantages over current methods, which typically use previously produced plans or blueprints to generate a conventional floor plan.

Plans and blueprints are normally produced before a structure is constructed or a property is developed, and often do not reflect any changes that were made during the construction process. The present method ensures accuracy, current up-to-date information, and avoids contravening the copyright of an architect or builder in preexisting plans or blueprints.

An additional advantage of the present method is the continuity of the collected measurements. Property overview images can be drawn a short time after measurements are collected, by the same individual who collected the measurements, ensuring accuracy and validity.

A further advantage of the present method is the accuracy of the method. On-site measurements are used to create a property overview image that is drawn to scale, containing measurement lines that represent actual measurements of rooms and outdoor spaces that were taken on-site. The measurement lines can then be placed in the property overview image at the location where the represented measurement was taken. These measurement lines can be retained as a permanent record of each measurement collected. The measurement lines can be depicted in a finished property overview image, or the measurement lines can be removed and retained invisibly as a record of each measurement.

Additionally, multiple measurement lines, representing multiple possible measurements for a single room or outdoor space, can be collected to allow the creator of a property overview image to have multiple options when defining rooms and outdoor spaces in the property overview image. A single measurement line that best represents a dimension of a space can be selected from multiple measurement lines.

Further, the present method uniquely measures outside spaces and structures, such as yards, pools, lawns, patios, porches, garages, attics, pool houses, ranches, pastures, farmland, lakes, roads, barns, paddocks, and other outside spaces and geographical features. The present method thereby depicts an entire property, drawn to scale, including yards, landscaping, and any structures, in a property overview image. Conventional methods either omit depiction of outside spaces and structures, or fail to depict the outside spaces and structures to scale, with accurately located outdoor structures and geographical features. The present method not only includes outside spaces, drawn to scale, but also includes extensive textual annotation and graphic images describing and depicting landscaping, pools, outdoor structures, such as storage sheds and gazebos, and various other outdoor features.

The measurement and depiction of outside spaces is a unique benefit of the present method, as yard space and outdoor features are often important information for potential buyers and sellers of a property.

The present method can also advantageously combine the use of satellite images with contemporaneous, on-site measurements, allowing large stretches of land, such as a 70-acre horse ranch, to be measured and depicted in a property overview image alongside an accurate, drawn-to-scale image of a house or similar structure located in or adjacent the large stretches of land.

For example, when depicting large properties, an "acreage plan" can contain multiple embedded or nested floor plan images. It is contemplated that a user viewing a property overview image can select one or more specific areas of the property overview image, which are linked to larger and/or more detailed images of the specific areas. It is also contemplated that a user could magnify or shrink a property overview image to view portions of the property overview image in greater detail or to view a larger portion of the property overview image at one time.

The property overview image can also be linked to numerous digital images of rooms in a structure, exterior views of a structure within a property, and views of outside spaces and outside structures within the property, using icons placed in the property overview image. For example, a property overview image could include icons linking to digital photographs of one or more rooms within a ranch house, an icon linking to a digital photograph of the exterior of the front of the ranch house, and one or more icons linking to digital photographs of pastures and stables located adjacent the ranch house.

Each icon can be located in the property overview image at the representative location where a digital image was collected, and can depict the direction and perspective of the represented digital image. The digital images can be displayed alongside text information relating to the depicted space, and can further contain links to lists of text information regarding an entire structure or property.

The present method is also advantageous due to its unique compilation of information. Simultaneous with the measurement process, various features, amenities, benefits, characteristics, qualities, materials, and geographical elements of a property can be recorded, and graphic images reflecting these features can be drawn and inserted into the property overview image. Unlike many conventional floor plans, the present method produces property overview images that also include annotated text information relating to features of a room, outside space, or outside structure displayed in the property overview image. Extensive textual annotation describing measurements, storage, built-in furniture, fixtures, textures, materials, ceiling, flooring, landscaping, and geographical features, and various other features can be included in the property overview image.

A final property overview image can be compiled as a seamless file, with one or more floor plans, including depictions of outside spaces, linked to a features listing for a property, and linked to one or more digital images of parts of a structure and/or outside spaces. The property overview image can be magnified or reduced to facilitate viewing.

Completed property overview images can be transferred to databases and other compilations of information, so that a user is able to access a detailed property overview image of a property, containing graphic images and annotated text information. The property overview images can be accessed using the internet and/or similar networks.

The present method combines a birds-eye perspective of a property with measurement lines representative of contemporaneous, on-site measurements to depict hidden details or characteristics that are difficult to otherwise visualize, such as open room layouts where a conceptual separation between rooms is not clear, or large, open outdoor areas. Multiple measurement lines, that can be color-coded, can be used to depict the dimensions of alternate separations of interior or exterior open space. For example, a large pasture separated by a fence can include three measurement lines: one measurement line representing the length of the entire pasture, one measurement line representing the length from a first edge of the pasture to the fence, and one measurement line representing the length from the fence to a second edge of the pasture.

The present method can further depict features and provide annotations for features not readily visible in a conventional floor plan, such as ceiling, roof, and attic lines, ceiling elevations, room and fixture materials and characteristics, and the presence of fixtures, storage, and objects.

The present method also includes the measurement of interior features such as wall interruptions, thereby recording important interior details of a room or structure, such as incremental wall space, that are not depicted or recorded in conventional floor plans. This information is useful for storage, arrangement and placement of furniture, and can be used by owners and potential buyers of a property to determine whether objects, such as furniture, can be maneuvered through certain wall interruptions or placed along certain wall spaces.

Because the present method produces in scale property overview images, measurement opinions for any other parts of a structure or outside space can generally be provided, and such measurements need not be contiguous space or walls.

The present method can produce property overview images depicting vaulted ceilings, overhead windows, transoms, trees, billboards, and similar indoor and outdoor elevated features, using a combination of drawing with a three-dimensional perspective and utilizing specific symbols and annotation. The depiction of elevated features is desirable for owners and potential purchasers due to the light or shade an elevated feature can provide to a room or to an outside space. Similar traits cannot be readily depicted in a conventional floor plan.

The drawings and amenities text produced using the method can be provided in various user-friendly computerized formats, such as Microsoft compatible formats, allowing the information contained within to be easily transferred via "cut-and-paste" functions into other programs and formats. Use of these formats can allow for an extremely easy and efficient transfer of information when a specific real estate agent or a specific database requires text or other information having a specific format.

By compiling an property overview image, measurement lines, graphic images, digital images, and textual information into a single computerized file, using icons and links to interconnect all images, the present method provides a self-contained product that is deliverable to a client, buyer, seller, or database. A user-friendly format, such as a PDF file accessible by Adobe Acrobat, which provides free software to the general public, can be used so that the images contained with the computerized file can be read by any user. The self-contained product can also be delivered to an internet site, allowing the interactive property overview image to be viewed by a widespread audience simultaneously.

The present method includes determining at least a first measurement of a space within a property, forming at least one measurement line.

A space can include any kind of indoor space, such as an office building, a house, an agricultural building, a floating vessel, a semisubmersible, a stadium, a theater, a pet house, a flying vessel, a garage, a store, a library, a recreational vehicle, an apartment complex, a playhouse, a tree house, a gazebo, a religious building, a sporting area, a retail space, a meeting area, a banquet area, a convention area, and other kinds of structures or spaces.

A space can also include any kind of outdoor space, such as a yard, a pasture, a field, farmland, a road, a river, a lake or pond, a forest, a ranch, open land, or any other type of outdoor space.

Spaces can also include outdoor structures, such as barns, animal housing, pool houses, sheds, paddocks, storage areas, fences, billboards and signs, and other similar outdoor structures.

Spaces can further include interior spaces, such as a room within a structure, a cabinet, a closet, or a wall interruption, such as a window, an alcove, a doorway, a column, a counter, or open space.

The space is contemplated to include multiple points, with each measurement being the distance between two of the points. For example, a measurement can include a length, width, or height of a room, the width of a window within a room, the distance between a tree and a fence in a pasture, or the distance between two unoccupied points in a field.

Measurement can be performed using any combination of manual, electronic, or digital measuring tools, such as through the use of a laser measurement tool, a measuring tape, or other measuring devices or measuring methods. For example, when measuring a room within a structure, measurements can be recorded by measuring along a wall of a room until the wall is interrupted by a wall interruption, such as a door or window. The wall interruption can subsequently be measured. The remainder of the interrupted wall can then be measured until another wall interruption is encountered, until an entire room length or room width has been measured. The recorded measurements not only provide an entire length or width of a room, but also the length of each wall interruption and the length of each segment of incremental wall space.

Measurement of these partial room lengths and partial room widths can be beneficial when a potential owner or buyer wishes to determine whether a piece of furniture or another object can be placed along a wall between two wall interruptions, or between one wall interruption and an adjacent wall. Conventional floor plans do not provide measurements of incremental wall space, which is a significant benefit of the present method.

In an embodiment, measurements can be performed by obtaining one or more satellite images of a space and determining one or more measurements using the satellite images. This embodiment is contemplated to be especially useful when measuring large stretches of acreage that are not easily measured using manual measuring tools, such as ranches, pastures, fields, farmland, lakes, and other outdoor spaces or structures.

Determining one or more measurements of a space forms one or more measurement lines, which can be depicted in a property overview image as a visual representation of an on-site measurement, at the location within the property overview image where the measurement was collected.

In a contemplated embodiment, a plurality of measurement lines can be formed relating to a single space, and one or more measurement lines that best represent the measurement of the space can be selected and depicted in a property overview image.

For example, when measuring an open space in a house, such as non-rectangular rooms or rooms not fully enclosed by walls, space in a convention center or auditorium, outdoor acreage, or similar open spaces, there can be multiple interpretations regarding where a first room or space terminates and a second room or space begins, and how to quantify the dimensions of the first and second room or space. A measurement line representing each possible measurement can be formed, and can optionally be color coded. Each formed measurement line can be depicted in the property overview image, or one or more selected measurement lines can be displayed.

It is also contemplated that multiple vertical measurements, such as heights of a room ceiling or heights of a wall interruption, can be measured for a space, such as a room having an irregular, domed, vaulted, or arched ceiling, or an irregular floor. Heights of outdoor features and structures, such as trees, fences, signs, shrubbery, and similar items can also be measured.

Vertical elevations, such as the distance between a floor and the bottom of a window or similar wall interruption, can also be measured. It is contemplated that elevations of fences, signs, and branches of trees can be measured as well.

In a contemplated embodiment, a height can be measured for an entire structure or for an entire floor within a structure. Additional heights can then be measured in rooms or other spaces with heights that differ from that of the height measured for the entire structure, or in rooms with irregular ceilings or irregular floors.

It is contemplated that measuring an elevated or suspended wall interruption, such as a window located a vertical distance above a floor or a set of elevated cabinets, can be beneficial when an owner or buyer wishes to determine whether an object or piece of furniture can be placed beneath a wall interruption. Measurements of elevated outdoor features, such as trees, can be beneficial when an owner or buyer wishes to determine shade provided by the outdoor features, or the quality of a view from a window within a structure.

It is further contemplated that one or more measurement lines can represent measurements of wall segments, such as a measurement of a partial room length taken along a wall of a room that extends between two wall interruptions. These measurements can be beneficial when a potential owner or buyer wishes to determine whether a piece of furniture or another object can be placed along a wall between two wall interruptions, or between one wall interruption and an adjacent wall.

Each measurement line can be a straight line with arrowhead endpoints, having a numerical label indicating the value of the measurement represented by the measurement line, though other styles of lines and labels can also be used. Each measurement line can represent an on-site, contemporaneous measurement and can be positioned in the property overview image at the location in the space where the measurement was collected. Because the property overview image is depicted in scale, one or more measurement lines can also be added upon request to depict an opinion of dimension for any part of the image.

After determining at least a first measurement of the space, the one or more determined measurements are input to a processor having data storage. The processor can be part of a computer, a cellular telephone, a personal digital assistant, a server that is directly or remotely accessible to one or more input or client devices, or other similar devices.

The inputting can be performed using any type of input device, such as a keyboard, a keypad, a mouse, a touch screen, or other similar means.

The data storage can include fixed data storage, such as a hard drive, removable data storage, such as a flash drive or memory stick, remote data storage, such as data storage in a server in networked communication with the processor, or any combinations thereof.

The present method also includes inputting textual information concerning the space and one or more graphic images concerning the space to the processor.

The textual information is contemplated to include extensive annotations of measurements, storage, built-in furniture, fixtures, textures, materials, ceiling, flooring, landscaping, other similar features, and combinations thereof, which can be displayed in the property overview image. Conventional floor plans do not provide extensive annotations of measurements, architectural details, textures, materials, and similar features.

The textual information can include a features listing of the space. The features listing can include any description of amenities, features, benefits, contents, components, materials, or characteristics of a structure, room, or outside space, in a list or tabular form, that can be categorized by room, area, type of feature, or other categorization. The features listing can be linked to the final property overview image, allowing users to seamlessly view the property overview image and a features listing for all or a portion of the property.

The one or more graphic images can be drawings, such as a drawing produced using a computer, icons, logos, clip arts, symbols, or combinations thereof. It is contemplated that one or more graphic images can correspond to one or more features listed in the features listing.

The graphic images can depict built-in furniture, fixtures, textures, materials, ceiling, flooring, landscaping, and other similar features. Conventional floor plans typically do not display extensive, detailed graphic images that correspond to textured flooring, locations and types of landscaping, and various other interior and exterior features.

In a contemplated embodiment, one or more graphic images can be easily recognized drawings or symbols for indicating a feature of a structure or outside space, such as a depiction of a tree or a sink. Use of easily recognized drawings or symbols can allow features to be visually presented without text and be readily recognized by a user.

The present method is contemplated to include extensive textual annotations and graphic images to depict a large number of features, amenities, materials, textures, and other items not depicted in conventional floor plans.

For example, the graphic images and textual information can depict and/or annotate appliances, such as beverage coolers or refrigerators, central vacuums, cook tops, concealed televisions, directional arrows for showing direction of slide-out appliances, dish washing drawers, dishwashers, electric baseboard heaters, electric gates, freezer drawers, filtered water appliances, garage door openers, glass faced refrigerators, hot water heaters, ice makers and ice machines, microwaves, ovens and double ovens, re-circulating hot water systems, refrigerators and freezers, stoves, stacked washers and dryers, trash compactors, vent hoods, wall mounted televisions, warming drawers, washers and dryers, and water softeners.

The graphic images and textual information can also depict and/or annotate built-in items, such as aquariums, architect's easels, architectural pediments, ballet barres, banquettes, bars, benches and bench seats, built-in shelving and/or cabinets, buffet servers, carved wood pediments, chair rails, chests of drawers, coffee and/or juice bars, cornices, cubbies, desks, directional arrows for showing directions of slide-out items or door openings, drip-dry rods, dumb waiters, faux columns with ionic capitals, floor to ceiling bookcases, fold-down ironing boards, kitchenettes, laundry chutes, Murphy beds, pot racks, projectors, rolling library ladders, room dividers, saunas, shelving units, storage cubicles and cubbies, wall mounted reading lamps, wainscoting, wall mounted television trays and swivel trays, wine racks, wine rooms, and wine cellars.

The graphic images and textual information can further depict and/or annotate cabinetry items, such as adjustable mirrors, appliance barns, bookcases with concealed entry, cabinets over peninsulas, computer and printer space, directional arrows for showing directions of door openings and/or pass throughs, glass cabinets, hinged vanity mirrors, lighted display cabinets, media and/or stereo cabinets, pull-out television slides, pull-out pantry slides, pantries, platter storage, rotating shelf pantries, sewing machine cabinets, spice racks, television niches, television cabinets with retractable doors, under counter washers and dryers, upper cabinets, work benches, and tool benches.

The present method can further include graphic images and textual information depicting nonconventional features related to ceilings and ceiling lines, including second floor overhangs, attic access stairs, balconies, barrel vaulted ceilings, beamed ceilings, ceiling mounted projectors, ceiling mounted projection screens, coffered ceilings, directional arrows showing directions of vaulted roofs or sloped ceilings, domed ceilings, dropped block ceilings, dropped ceiling lines, gambrel ceilings, glass ceilings, groin vaulted ceilings, hand-painted ceilings, paneled wood ceilings, skylights, soffits, sloped ceiling lines, tray ceilings, vaulted ceilings, vaulted and ribbed ceilings, and wood beamed ceilings.

It is further contemplated that the graphic images and textual information can depict closets and closet features, such as air conditioning or maintenance closets, basket towers, butler's storage closets, broom closets, cedar closets, climate controlled storage, directional arrows showing directions of sliding mechanisms or pull down hanging bars, double hanging bars, floored attic storage, linen closets, lockable closets and/or storage, pegboard, pull-down bars, single hanging bars, triple hanging bars, utility closets, and walk-in closets.

The graphic images and textual information can further depict and/or annotate counters and under-counters, such as bars and pass-through bars, breakfast bars, butcher blocks, corner lazy susans, knee space, drawers, directional arrows showing the direction of pull-out shelves and drawers, drawer and cabinet pulls and hardware, lift-up work surfaces, slab granite and/or marble counters, slide-out keyboard trays, under counter bookcases, under counter cabinets, under counter dishwashers and dishwasher drawers, under counter drawers, under counter refrigerators, under counter lazy susans, under counter pull-out shelves, under-counter pull-out baskets, under counter swing out storage trays, under counter slotted stemware racks, under counter trash slides, under counter washers and dryers, under counter wine coolers, vanities, and wet bars.

The present method can further include graphic images and/or textual information depicting and/or annotating doors, such as bi-fold doors, cased openings, directional arrows showing the directions of sliding, swinging, or fold flat against the wall doors, swing-in and swing-out double doors, double glass doors, double pocket doors, dutch doors, glass doors, swing-in and swing-out left doors, mirrored doors, pocket doors, swing-in and swing-out right doors, saloon doors, sliding doors, and swing doors.

It is contemplated that the present method can further use textual information and/or graphic images to depict and/or annotate elevators and elevator features, including interior and exterior elevators, elevator guard gates, elevator telephones, and spaces for future elevators.

The textual information and/or graphic images can further depict and/or annotate fireplaces, such as corner fireplaces, double-sided fireplaces, gas log fireplaces, fireplace mantels, fireplace hearths, fireplace screens, and wood burning fireplaces.

The present method can also use textual information and/or graphic images to depict and/or annotate floors and flooring features, materials, and/or textures, such as directional arrows for showing directions or pathways from one room to another, drains, floor plugs, hardwood floors, inset carpets, marble floors, moats, mosaics, parquet floors, sealed garage floors, slate floors, tiles, travertine, and wide plank floors. Textual information and/or graphic images can also depict and/or annotate inlaid wood floors, inlaid stone floors, inlaid tiles floors, and similar types of floors. It is contemplated that graphic images can depict a representation of the actual pattern and/or texture of the floor being depicted. For example, checkered tile patterns, slatted wooden floors, and similar patterns can be shown using graphic images.

The present method can also include textual information and/or graphic images for depicting and/or annotating lighting, such as bathroom vanity strips, coffered ceiling lighting, concealed lighting, cove lighting, directional arrows for showing direction of lighting or wall mounted lamps that swing back against a wall, pendant lighting, reading lamps, sconce lighting, track lighting, and vertical make-up lighting.

The textual information and/or graphic images can also depict and/or annotate plumbing and related fixtures, such as bidets, handheld bidets, claw footed tubs, corner tubs, directional arrows for showing the direction of swinging for pot fillers and shower arms, elevated shaving sinks, garden tubs, jacuzzis, retractable hot and cold taps, showers, shower drains, shower heads, steam rooms, toilets, and whirlpool tubs.

The present method can further include using textual information and/or graphic images to depict and/or annotate porch features, such as arched colonnades, exterior ceiling fans, walled courtyards, covered balconies, covered porches, directional arrows showing entry and exit pathways, glass enclosed porches, loggia, porte cochere, screened porches, and covered walkways.

It is contemplated that the textual information and/or graphic images can further annotate and/or depict shelves, such as adjustable shelves, ceiling level shelves, directional arrows for showing the direction of pull-out shelving or pull-out baskets, interior and exterior display shelves, glass shelves, overhead storage shelves, rafter storage, interior and exterior shelving, wire baskets, wire shelves, and wrap-around shelves.

The present method can further use textual information and/or graphic images to depict and/or annotate sinks, such as six-sided sinks, bathroom basins and sinks, double sinks, elevated shaving sinks, film developing sinks, pedestal sinks, shell-shaped scalloped sinks, single sinks, triple sinks, and vessel sinks.

The textual information and/or graphic images can be used to depict and/or annotate stair features, such as balustrades, banisters, carpeted stairs, directional arrows showing directions to upstairs and to downstairs, hardwood stairs with or without carpet runners, newel posts, steps, spiral stairs, interior and exterior stairs and steps, and under stair storage.

The present method also contemplates using textual information and/or graphic image to depict and/or annotate various types of walls and rooms, such as half walls, archways, art niches, atriums, banquet and reception spaces, basketball courts, brick accent walls, cable outlets, catering kitchens, computer lofts, darkrooms, directional arrows for showing direction or flow from one area to another, electrical outlets, finished garages, floored attic storage, exercise rooms and fitness centers, gallery hallways, glass block walls, hobby and craft rooms, kitchen offices, loft walls, media rooms, mirrored walls, mud rooms, music rooms, natatoriums, overhead lofts, paneled walls, quarters, recessed telephone niches, steam rooms, sunrooms, theatres, tool hooks, trains along ceilings, walls open to ceilings, and workshops.

It is also contemplated that the textual information and/or graphic images can annotate and/or depict windows and window features, such as second tier windows, accent windows, arched windows, bay windows, beveled and leaded glass windows, black-out shades, butted glass windows, casement windows, ceiling height windows, directional arrows for showing the direction of swing for casement and other specialty windows, divided light windows, dormer windows, elevated windows, fanlights, fixed windows, glass block windows, juliet balconies, palladian windows, plant windows, plantation shutters, privacy windows, shutters, sidelights, stained glass, scrolled ironwork windows, transoms, walls of floor to ceiling windows, and window alcoves.

The textual information and/or graphic images can further depict and/or annotate exterior and yard features, such as air conditioner compressors, arbors and pergolas, arched colonnades, automatic watering systems, awnings, balcony flower baskets, bamboo groves, bicycle storage racks, boat slips, brick fire pits, brick walkways, patios, and courtyards, cabanas, children's play sets and forts, circular driveways, coachman's lanterns, container plants, courtyards, covered outdoor stairs, directional arrows for showing directions toward other structures or geographical features, diving boards, dog kennels and dog runs, drains, extended driveway aprons, flagpoles, flagstones, flower beds, flower boxes on windows, exterior post lights, flowering shrubs, stand alone fountains, spillway and bubbler fountains and other fountains in pools, garage storage systems, garden lights and lamp posts, gardener's closets and sheds, garden trellis, gates, gazeboes and pergolas, glass enclosed porches, grassy lawns, golf courses, hedges, hot tubs, mature trees with branching canopies, meandering pathways, mosquito control systems, off-street parking spaces, outdoor grills, outdoor kitchens, outdoor living spaces, outdoor storage sheds, outside showers, overhead lattice arbors, park benches, park-like settings, parking spaces and extra parking, patios and terraces, patio furniture, paved motor courts, paverstones, picket fences, privacy hedges, pocket gardens, ponds and koi ponds, pools, pool bars with swim up barstools, pool decks, pool ladders, pool slides, pool steps, pool tanning shelves, pool equipment and filters, porte cochere, professional landscaping, potting sheds, putting greens, putting green flags, river rock walkways and gardens, roof top patios, shrubs, solariums, spas, sports equipment storage racks, stepping stones, trees, tropical plants and palms, vines trained to trellis, walled gardens, waterfalls in pools, water lilies, wood planked decks and balconies, wrought iron railings, and yard drains.

The present method can further use textual information and/or graphic images to annotate and/or depict outdoor structures, such as an eight-stall horse barn. The textual information and graphic images could depict and/or annotate steel roll-up doors, skid resistant aisle ways, horse stalls, doors to horse stalls, windows in horse stalls, air conditioned powder rooms, toilets, powder room sinks, air conditioned offices, refrigerators, adjustable shelves, air conditioned utility rooms, pegboards, wire shelves, bridle hooks, space for a full-sized washer and dryer, shelves over a washer and dryer, pegboard lined storage lockers, feed storage rooms, pegboards, double doors, horse bathing and grooming stations, exit doors to an arena, and directional arrows indicating orientation toward an adjacent house.

Depiction and/or annotation of ranch structures, equipment, and areas can also include textual information and/or graphic images annotating and/or depicting outdoor riding arenas, grassy turfs, stadium lighting, riding arena fencing, covered and lighted training pens, training pen fencing and gates, horse stocks, washing stations with rubber matting and cross-ties, covered and lighted storage for hay and equipment, vaulted roofs on training pens, outdoor lighted hydraulic horse exercisers, fencing and paddocks for a horse exerciser with a gate, directional arrows showing the direction toward a barn, covered parking for trucks and trailers, outdoor trailer parking, extended driveway aprons, and water pumping stations.

Textual information and/or graphic images can further be used to annotate and/or depict exterior land, such as directional arrows for showing the direction toward other structures or geographical features, roadways, pathways, and walkways between buildings and geographical features, pastures, pasture fencing, pasture shelters, lakes stocked with fish, fishing docks, and trees showing shaded areas of pastures for livestock.

The present method can then include forming a property overview image of the space using computer instructions in the data storage, each measurement taken, one or more of the measurement lines formed, the textual information input, and the graphic images input. The property overview image is contemplated to depict a property in its entirety, including any structures within the property as well as any outside spaces.

The property overview image is contemplated to be a detailed representation of a property, drawn to scale, depicting any number of recorded features using graphic images, and labeling any number of recorded features using textual information.

In an embodiment, one or more icons can be placed on the property overview image. Each icon can be linked to at least one digital image of the space. The icons can be any type of symbol, such as a numbered arrow located at the position on the property overview image where the linked digital image was obtained, and indicating the direction or perspective of the digital image.

Each digital image can be an image of the space from one of a plurality of perspectives, including a birds-eye view, an elevated view, a frontal view, a top view, a side view, a first person view, a bottom view, and other similar views.

The one or more digital images can be photographs, digital photographs, scanned images, virtual tours, or drawings of one or more rooms or outside spaces.

In an embodiment, one or more digital images can include satellite images of the space.

In a contemplated embodiment, the present method can include obtaining one or more digital images of the space, such as by photographing the space, videoing the space, obtaining one or more satellite images of the space, or combinations thereof.

It is contemplated that by accessing the icons, a user can view the digital images linked to the selected icon. Each digital image can be displayed with textual information describing features of the depicted area. The display including the digital image can include links for returning to the property overview image of the property, or to view a features listing for the part or all of the property.

The present method then includes outputting the property overview image for viewing by one or more users. The outputting can be performed using one or more output devices in direct or remote communication with the processor, such as a computer monitor, a cellular or personal digital assistant display screen, or a printer. The outputting can also include creating a digital file, such as PDF file, and transmitting the file to a user, such as by using e-mail.

The user can access the property overview image, each digital image through the one or more icons, and the textual information seamlessly due to the present method's compilation of the property overview image with the embedded digital images, and the visually presented text information. Each display, whether depicting the property overview image of the property, a textual features listing of the property, or a digital image alongside textual features of a depicted area of the property, can include links to allow the user to view any other portion of the property overview image, any digital image, or any textual information that has been input to the processor.

In an embodiment, a property overview image can include multiple embedded, or nested, floor plans, such as when depicting a large property containing multiple structures or outside spaces. For example, when viewing a property overview image of a 70-acre ranch, it is contemplated that a user can select a linked icon, representing a ranch house on the property, to view an enlarged floor plan of the ranch house. The floor plan of the ranch house can include links to return to the property overview image of the entire property. Similar enlarged views of pastures, stables, and similar outdoor spaces and structures can also be viewed.

The present method can further include measuring one or more cabinets, which can include a cabinet length, a cabinet width, and a cabinet height. It is contemplated that when measuring one or more suspended or elevated cabinets, a cabinet elevation can also be measured. This can be beneficial when an owner or buyer wishes to determine whether one or more objects or pieces of furniture can be placed beneath one or more elevated cabinets.

The elevation and measurements of other features and amenities, such as shelving, sinks, counters, handicap accessible areas, storage and other features can also be measured and indicated in the property overview image.

The present method can also include measuring dimensions of closets. In addition to a length, width, and/or height of a closet, any features or characteristics of a closet can also be depicted, such as double and single hanging bars, pull down bars, cabinets, drawers, shelves, accessory hooks, benches, under-bench storage, windows, steaming stations, pants presses, mirrored walls and doors, mirrors, specialized lighting, and skylights.

Other additional spaces such as pantries, stairways, powder rooms, bath rooms, lofts, alcoves, bay windows, bow windows, upper floor landings, attics, under-stair storage areas, and hallways can be measured. By convention, additional spaces such as closets and pantries are generally regarded as features of the room to which they are adjacent, rather than separate rooms, however, it is contemplated that additional spaces could also be measured, labeled, and depicted as separate rooms using the present method.

In an embodiment, the present method can also include locating at least one outlet, which can include electrical outlets, cable outlets, such as Ethernet, Digital Subscriber Line, or Broadband outlets, telephone outlets, and other types of outlets. The location of one or more outlets can be depicted in the property overview image. This can be useful when an owner or potential buyer is contemplating the arrangement and location of furniture, electrical items, appliances, wiring and cabling, and other contents.

It is contemplated that accessing the one or more icons, such as by using a mouse, a keyboard, a touchpad, or a stylus, will allow a user to view each of the digital images, such as on a computer display. It is also contemplated that a display containing a digital image can have one or more icons, buttons, or links that can be accessed to view the property overview image, or view the text information for the entire property.

The processor can be in communication with a network, such as the internet, a local area network, a wireless network, a satellite network, a cellular network, an intra-net, a web page, or a portal. It is contemplated that the images produced by the present method can be uploaded and stored in a data repository, such as a local or national real estate listing, or presented on one or more internet pages. It is also contemplated that the images produced by the present method can be sent via e-mail as a self-contained file, or printed, such as by using a printer.

In an embodiment, computer instructions can be used to permit a user to add one or more furniture icons to the property overview image. It is further contemplated that the computer instructions can permit the user to move the furniture icons within the property overview image, rotate the furniture icons, add textual captions to the furniture icons, enlarge or shrink the furniture icons, or delete furniture icons. Furniture icons can include any type of furniture, any type of built-in or removable structural feature, or any type of outdoor feature, such as trees and landscaping.

This embodiment is contemplated to be especially useful for assisting users with the virtual arrangement, furnishing, and landscaping of a property when contemplating purchase of the property. Users who are able to determine aesthetic locations in which to place furniture that is already owned, and/or determine any pieces of new furniture or new landscaping features which may be needed are able to make informed decisions regarding the purchase of a property, and are more likely to purchase a property that provides an property overview image that allows for this virtual arrangement and placement of furniture icons versus a property that does not.

In an embodiment, the computer instructions are contemplated to also permit the user to add or remove walls from the property overview image, thereby allowing users who are contemplating interior remodeling of a property to virtually simulate the contemplated changes. It is contemplated that trees, fences, windows, and similar features can also be added and/or removed from the property overview image.

It is also contemplated that in an embodiment, computer instructions can be used to allow a user to magnify or shrink the property overview image, which is contemplated to be useful when a user wishes to visualize a portion of the property overview image in greater detail by enlarging the property overview image, or to visualize a larger portion of the property by shrinking the property overview image.

Referring now to FIG. 1, a flow diagram depicting the steps of an embodiment of the present method is shown.

The depicted embodiment of FIG. 1 includes determining at least a first measurement of a space within a property forming at least one measurement line 500. Any number of measurements can be determined, depending on the dimensions and nature of the space to be measured, and any number of measurement lines can be formed.

For example, when measuring a room within a house, the length and width of the room can be measured, and optionally, the height of the room can also be measured. When measuring a portion of a pasture on a ranch, only a single measurement, such as the distance between a fence and a tree, may be necessary. When measuring a pond or lake, multiple widths, lengths, diameters, and depths may be measured.

FIG. 1 then includes inputting the measurements into a processor having data storage 502. The inputting of the measurements can be performed on-site, such as by using a wireless device having data storage, or a device in remote communication with data storage. The inputting of the measurements can also be performed off-site, after collecting the measurements.

FIG. 1 also depicts the optional step of obtaining at least one digital image of the space 504. Digital images can be obtained by photographing or videoing the space. It is also contemplated that the obtained digital images can be satellite images.

This step can also be omitted, and preexisting digital images, such as photographs provided by a property owner, can be used.

Textual information and at least one graphic image concerning the space are then input into the processor 506. The textual information and graphic images can be input in the same manner as the measurements, or a different manner. For example, measurements and textual information can be input remotely, using a wireless device on-site, while graphic images representing features of a space can be drawn or selected at a later time and input directly to the processor.

The inputting of the graphic images can be done by drawing graphic images that represent features of the space. It is also contemplated that preexisting graphical images, such as clip art or drawings that have been previously produced, can be used.

A property overview image is then produced using computer instructions in the data storage, the measurements, the measurement lines, the textual information, and the graphic images 508.

In an embodiment, the property overview image can be generated contemporaneously, on-site, using a wireless device such as a portable computer, or a device in remote communication with a processor. The property overview image can also be generated at a later time, through direct communication with the processor.

It is contemplated that portions of the property overview image can be produced by manual or computer-assisted drawing, obtained from satellite images, generated automatically by the processor using the measurements and the computer instructions, or combinations thereof.

At least one icon can then be placed on the property overview image 510. The icons can be drawn or selected from preexisting images or icons. Each icon can be identical, or different icons can be used for linking to different images or different kinds of images.

For example, icons linked to perspective views of a space can include arrowheads that point in a direction indicating the perspective of the digital image linked to the icon. Icons linked to satellite images or different types of views can include other shapes or symbols.

The depicted embodiment then includes linking each icon to at least one digital image of the space 512. It is contemplated that selecting an icon will allow a user to view a display containing one or more digital images of the space. In an embodiment, the digital images can be accompanied by textual information related to the space. The display can include links to return to the property overview image and links to a textual features listing relating to the property.

The property overview image is then output for viewing by a user 514. Outputting the property overview image can include depicting the image on a display device allowing a user to interact with the property overview image by selecting links. The property overview image can also be output using a printer. It is further contemplated that the property overview image can be output by transmitting the property overview image and all related digital images and textual information to a user's computer or similar device as a computer file.

Figure 2:
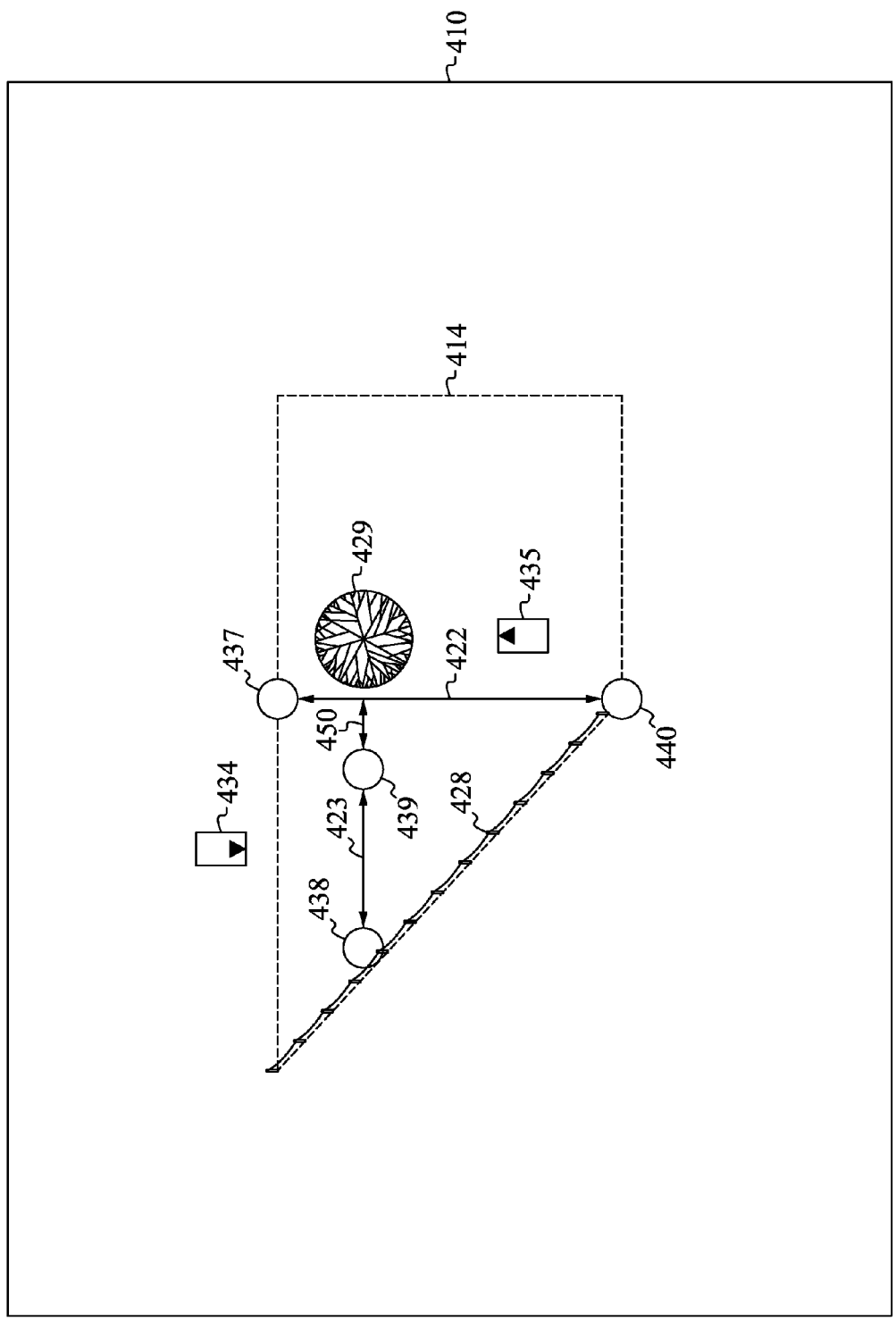
FIG. 2 depicts a diagram of an outdoor space with measurement lines and graphic images.

FIG. 2 depicts a diagram of an outdoor space and measurement lines illustrative of the present method.

A property 410 is shown, which can be any type of property, including a ranch, a homestead, a tract of land, a structure, and other similar types of property.

The property 410 includes a space 414, which can be any type of space 414 that can be contained within a property, such as a room within a structure, an area of land within a larger tract of land, a structure on a tract of land, or any other portion of a property.

FIG. 2 depicts property 410 as a tract of land, with space 414 being a portion of land within property 410, marked by various physical features and manmade structures.

Space 414 includes a plurality of points, of which four points are depicted, 437, 438, 439, and 440. Each point can represent any position within space 414, such as the location of a tree, large rock, or fencepost. Each point can also represent open space.

While FIG. 2 visibly depicts each point 437, 438, 439, and 440, it is contemplated that each point can be located for measurement purposes only, and not depicted in a finished property overview image. Each measurement can be a distance between any two points within space 414, between any two boundaries of space 414, or between any two objects located within space 414.

A first measurement line 422 is shown between first point 437 and fourth point 440, which are located at the boundaries of space 414. Thus, first measurement line 422 represents the width of space 414.

A second measurement line 423 is shown between second point 438 and third point 439. Second point 438 is shown along a first graphic image 428, which depicts a fence along the edge of space 414. Third point 439 is depicted within space 414 and can represent the location of a tree, a large rock, an outdoor structure, or simply open space.

A third measurement line 450 is shown between third point 439 and a second graphic image 429, which depicts a tree at the edge of space 414.

A first icon 434 is depicted adjacent space 414 as an arrow pointing toward space 414. It is contemplated that first icon 434 can link to a digital image of the portion of space 414 at which the arrow points, taken from the location at which first icon 434 is located.

A second icon 435 is depicted within space 414 as an arrow pointing toward second graphic image 429. It is contemplated that second icon 435 can link to a digital image of the portion of space 414 at which the arrow points, taken from the location at which second icon 435 is located.

Figure 3:
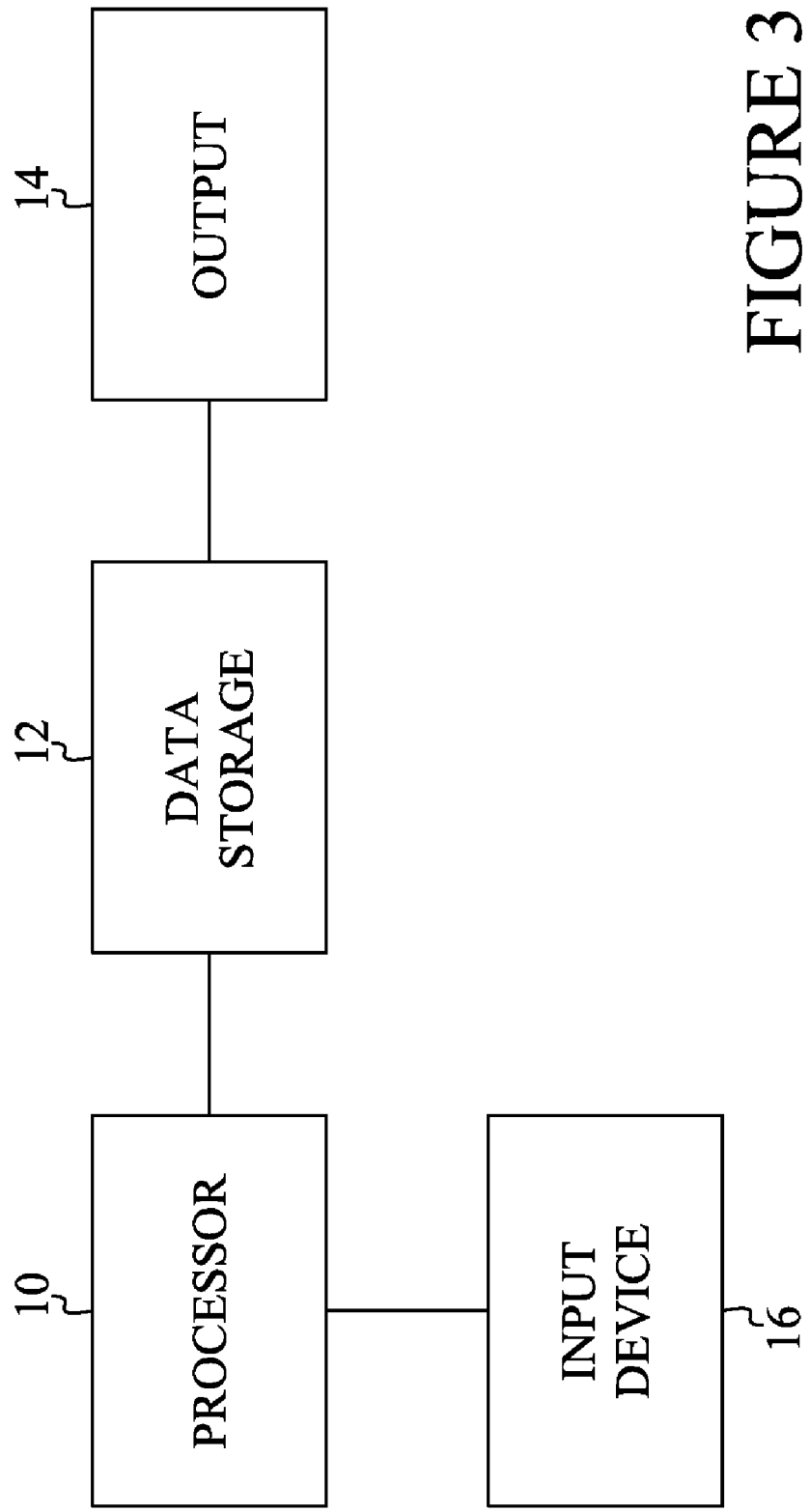
FIG. 3 depicts a diagram displaying the interactions between the computer components of a property presentation and visualization system useable with the present method.

Referring now to FIG. 3, a diagram depicting the interactions between the computer components of a property presentation and visualization system useable with the present method is depicted.

Processor 10 is connected to data storage 12 for processing data, such as measurements and textual information. Processor 10 can be any kind of processor, including that found in a computer. Data storage 12 is adapted to store data, including measurements, structural information, and computer instructions. Data storage 12 can be any kind of data storage medium, such as a computer hard drive, a CD-ROM, a DVD-ROM, a floppy disk, paper, or a removable storage media.

Data storage 12 is connected to an output 14. Output 14 can output images generated from the data stored in data storage 12. Output 14 can be any kind of display or output, including a computer monitor, a cellular telephone display, a personal digital assistant, a television, a printer, other displays, or other outputting means such as a digital file. Output 14 can include a PDF file readable by Adobe Acrobat.

Input device 16 is connected to processor 10, for inputting measurements, textual information, images, and commands into processor 10. Input device 16 can be a keyboard, a mouse, a microphone and voice recognition software, a touch screen, a cellular telephone, a personal digital assistant, or other kinds of input devices.

Figure 4:
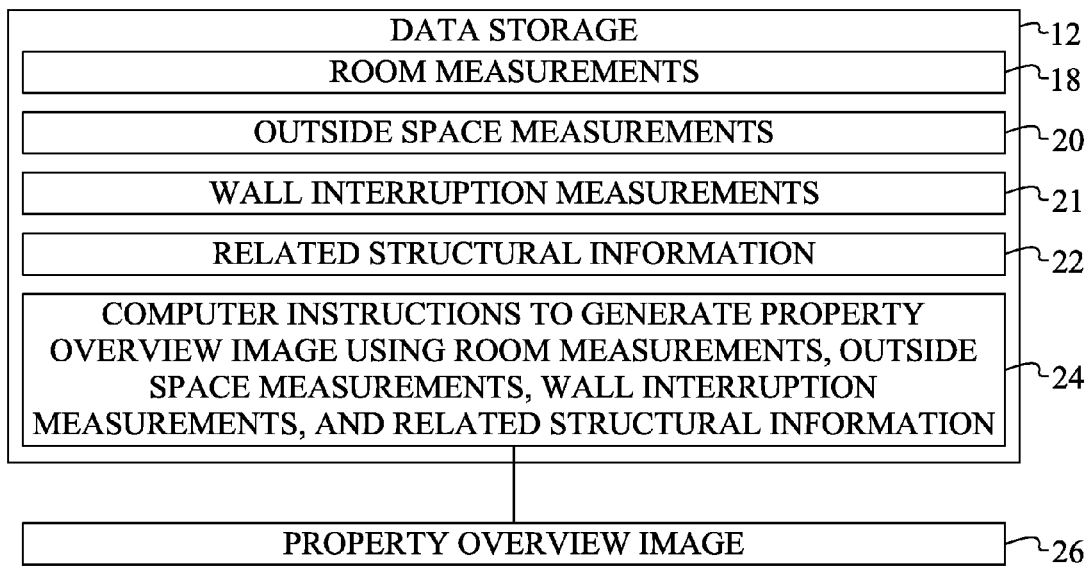
FIG. 4 depicts a diagram displaying the contents of the data storage of the property presentation and visualization system of FIG. 3.

Referring now to FIG. 4, a diagram depicting the contents of the data storage of FIG. 1 is shown.

Data storage 12 contains room measurements 18, outside space measurements 20, wall interruption measurements 21, and related structural information 22, which can include textual information and graphic images.

Data storage 12 also contains computer instructions 24, which are used to generate property overview image 26 using room measurements 18, outside space measurements 20, wall interruption measurements 21, and related structural information 22.

Property overview image 26 is drawn to scale using room measurements 18, outside space measurements 20, and wall interruption measurements 21. Property overview image 26 further contains annotated text, graphic images, and digital images contained within related structural information 22.

Figure 5:
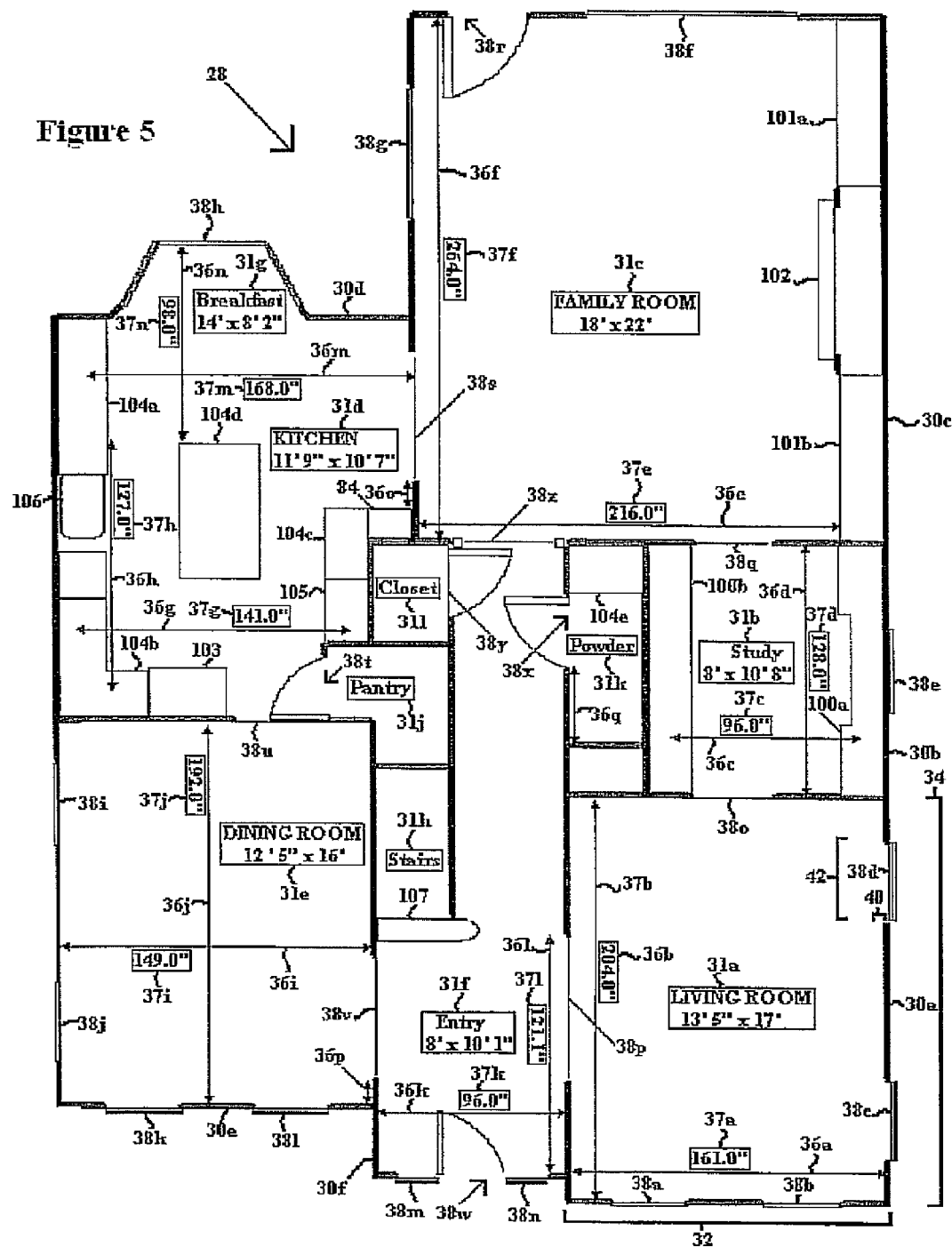
FIG. 5 depicts an embodiment of an image displaying a floor plan of the first floor of a structure containing measurement lines produced using the present method.

Referring now to FIG. 5, an embodiment of a property overview image is depicted. The property overview image depicted in FIG. 5 is an exemplary image produced after measuring a structure and forming measurement lines, but prior to inputting related structural information such as graphic images and icons for linking to digital images in the property overview image. Additional lines to depict some of the features and objects of a room are also included. While the structure depicted in FIG. 5 contains multiple floors, only the first floor has been depicted in FIG. 5 for exemplary purposes.

FIG. 5 depicts a floor plan of structure 28. Structure 28 can be any kind of structure, but is depicted in FIG. 5 as a house. Structure 28 is depicted having six major rooms, first room 30*a*, second room 30*b*, third room 30*c*, fourth room 30*d*, fifth room 30*e*, and sixth room 30*f*.

First room 30*a* has an exemplary room length 32, such as thirteen feet and five inches, and an exemplary room width 34, such as seventeen feet. First room 30*a* has a first room label 31*a*, which identifies the nature of first room 30*a* and differentiates first room 30*a* from other rooms. First room label 31*a* also includes the dimensions of first room 30*a*, such as 13' 5"×17'. The dimensions included in first room label 31*a* can be rounded to the nearest inch. It is contemplated that the dimensions included in first room label 31*a* can be in feet and inches, or in other units, such as metric units.

First room 30*a* is also depicted having a first measurement line 36*a*, which represents the length of first room 30*a* and can be located in the property overview image relative to the location at which the on-site measurement being represented was collected. First measurement line label 37*a* indicates the numerical value of the measurement represented by first measurement line 36*a*, such as 161.0". First measurement line label 37*a* is depicted displaying a measurement in inches, though the numerical value of first measurement line label 37*a* can be expressed in any unit, including feet or metric units.

First room 30*a* also has a second measurement line 36*b*, which represents the width of first room 30*a* and can be located in the property overview image relative to the location at which the on-site measurement being represented was collected. Second measurement line label 37*b* indicates the numerical value of the measurement represented by second measurement line 36*b*.

First room 30*a* is also depicted having six wall interruptions, first wall interruption 38*a*, second wall interruption 38*b*, third wall interruption 38*c*, fourth wall interruption 38*d*, fifteenth wall interruption 38*o*, and sixteenth wall interruption 38*p*.

First wall interruption 38*a*, second wall interruption 38*b*, third wall interruption 38*c*, and fourth wall interruption 38*d*, are depicted accommodating windows disposed between first room 30*a* and the exterior of structure 28. Fourth wall interruption 38*d* has an exemplary wall interruption length 40, such as six inches, and an exemplary wall interruption width, such as four feet.

Fifteenth wall interruption 38*o* is depicted as a pass-through opening disposed between first room 30*a* and second room 30*b*. Sixteenth wall interruption is depicted a pass through opening disposed between first room 30*a* and sixth room 30*f*.

Second room 30*b* is depicted having a second room label 31*b*, such as "Study", which identifies the nature of the room and differentiates second room 30*b* from other rooms. Second room label 31*b* also includes the dimensions of second room 30*b*.

Second room 30*b* is also depicted having a first built-in cabinet unit 100*a* and a second built-in cabinet unit 100*b*. It is contemplated that first built-in cabinet unit 100*a* and second built-in cabinet unit 100*b*, while depicted only as rudimentary lines in the property overview image of FIG. 5, can be later modified using graphic images and annotated text information, to better depict the represented features.

Second room 30*b* has a third measurement line 36*c*, which represents the distance between first built-in cabinet unit 100*a* and second built-in cabinet unit 100*b*, and can be located in the property overview image relative to the location at which the on-site measurement being represented was collected. Due to the space occupied by first built-in cabinet unit 100*a* and second built-in cabinet unit 100*b*, third measurement line 36*c* represents only the useable length of second room 30*b*, rather than the full length of second room 30*b*. Third measurement line label 37*c* indicates the numerical value of the measurement represented by third measurement line 36*c*.

Second room 30*b* also has a fourth measurement line 36*d*, which represents the width of second room 30*b* and can be located in the property overview image relative to the location at which the on-site measurement being represented was collected. Fourth measurement line label 37*d* indicates the numerical value of the measurement represented by fourth measurement line 36*d*.

Second room 30*b* has a fifth wall interruption 38*e*, which is depicted accommodating a window disposed between second room 30*b* and the exterior of structure 28. Second room 30*b* also has fifteenth wall interruption 38*o*, depicted as a pass-through opening disposed between second room 30*b* and first room 30*a*. Second room 30*b* further has a seventeenth wall interruption 38*q*, depicted as a pass-through opening disposed between second room 30*b* and third room 30*c*.

Third room 30*c* is depicted having a third room label 31*c*, which identifies the nature of third room 30*c* and differentiates third room 30*c* from other rooms. Third room label 31*c* also includes the dimensions of third room 30*c*.

Third room 30*c* is also depicted having a first built-in cabinet base 101*a*, a second built-in cabinet base 101*b*, and a fireplace 102. It is contemplated that first built-in cabinet base 101*a*, second built-in cabinet base 101*b*, and fireplace 102, while depicted only as rudimentary lines in the property overview image of FIG. 5, can be later modified using graphic images and annotated text information, to better depict the represented features.

Third room 30*c* has a fifth measurement line 36*e*, which represents the distance between second built-in cabinet base 101*b* and an opposing wall and can be located in the property overview image relative to the location at which the on-site measurement being represented was collected. Due to the space occupied by second built-in cabinet base 101*b*, fourth measurement line 36*d* represents only the space between second built-in cabinet base 101*b* and an opposing wall, rather than the full length of third room 30*c*. Fifth measurement line label 37*e* indicates the numerical value of the measurement represented by fifth measurement line 36*e*.

Third room 30*c* also has a sixth measurement 36*f*, which represents the width of third room 30*c*. Sixth measurement line label 37*f* indicates the numerical measurement represented by sixth measurement line 36*f*.

Third room 30*c* is also depicted having a sixth wall interruption 38*f* and a seventh wall interruption 38*g*, which accommodate windows disposed between third room 30*c* and the exterior of structure 28.

Third room 30*c* further has seventeenth wall interruption 38*q*, depicted as a pass-through opening disposed between second room 30*b* and third room 30*c*. Third room 30*c* also has an eighteenth wall interruption 38*r*, which is depicted accommodating a door disposed between third room 30*c* and the exterior of structure 28. Third room 30*c* additionally has a nineteenth wall interruption 38*s*, depicted as a pass-through opening disposed between third room 30*c* and fourth room 30*d*.

Fourth room 30*d* is depicted as an irregularly shaped room having an alcove, such as a breakfast alcove. As such, fourth room 30*d* has two room labels, fourth room label 31*d* and seventh room label 31*g*. Fourth room 30*d* further has two pairs of measurement lines, seventh measurement line 36*g*, eighth measurement line 36*h*, thirteenth measurement line 36*m*, and fourteenth measurement line 36*n*. Thus, fourth room 30d has been conceptually divided into two rooms for purposes of measurement and labeling.

Fourth room label 31d identifies the nature of fourth room 30d and differentiates fourth room 30d from other rooms. Fourth room label 31d also includes the dimensions of the portion of fourth room 40d excluding the alcove. Seventh room label 31g identifies the nature of the alcove portion of fourth room 30d and includes the dimensions of the alcove portion of fourth room 40d.

Fourth room 30d has a first counter 104a, a second counter 104b, and a third counter 104c. Fourth room 30d further has a fourth counter 104d, disposed in the center of fourth room 30d. Fourth room 30d also has a refrigerator 103, an oven 105, a cabinet 84, and a sink 106. It is contemplated that first counter 104a, second counter 104b, third counter 104c, fourth counter 104d, refrigerator 103, oven 105, cabinet 84, and sink 106, while depicted only as rudimentary lines in the property overview image of FIG. 5, can be later modified using graphic images and annotated text information, to better depict the represented features.

Fourth room 30d has a seventh measurement line 36g, which represents the useable length between second counter 104b and oven 105 and can be located in the property overview image relative to the location at which the on-site measurement being represented was collected. Due to the space occupied by second counter 104b and oven 105, seventh measurement line 36g represents only the useable space between second counter 104b and oven 105, rather than the full length of fourth room 30d. Seventh measurement line label 37g indicates the numerical value of the measurement represented by seventh measurement line 36g.

Fourth room 30d has an eighth measurement line 36h, which represents the distance between second counter 104b and the opposite edge of fourth counter 104d. Fourteenth measurement line 36n represents the distance between fourth counter 104d and the opposing wall of fourth room 30d. Thus, eighth measurement line 36h and fourteenth measurement line 36n comprise the full width of fourth room 30d, though fourth room 30d has been conceptually separated by fourth counter 104d, creating two rooms for measurement purposes.

Eighth measurement line label 37h indicates the numerical value of the measurement represented by eight measurement line 36h. Fourteenth measurement line label 37n indicates the numerical value of the measurement represented by fourteenth measurement line 36n.

Fourth room 30d also has a thirteenth measurement line 36m, which represents the useable length between first counter 104a and an opposing wall and can be located in the property overview image relative to the location at which the on-site measurement being represented was collected. Due to the space occupied by first counter 104a, thirteenth measurement line 36m represents only the useable length between first counter 104a and an opposing wall, rather than the full length of fourth room 30d. Thirteenth measurement line label 37m indicates the numerical value of the measurement represented by thirteenth measurement line 36.

Fourth room 30d has an eighth wall interruption 38h, which is depicted accommodating three windows surrounding an alcove, disposed between fourth room 30d and the exterior of structure 28.

Fourth room 30d also has a nineteenth wall interruption 38s, which is depicted accommodating a pass-through opening disposed between third room 30c and fourth room 30d. Fourth room 30d further has a fifteenth measurement line 36o, which represents a measurement for the distance between cabinet 84 and nineteenth wall interruption 38s. A measurement such as that represented by fifteenth measurement line 36o is useful, such as when a potential purchaser wishes to know whether a piece of furniture or another item can be placed along a wall without impacting adjacent features or obstructing adjacent openings such as nineteenth wall interruption 38s.

Fourth room 30d further has a twentieth wall interruption 38t, which is depicted accommodating a door disposed between fourth room 30d and an additional space, such as a closet, a pantry, a powder room, or a stairway. Tenth room label 31j labels and identifies the nature of the additional space adjacent to fourth room 30d.

Fourth room 30d also has a twenty-first wall interruption 38u, which is depicted accommodating a pass-through opening disposed between fourth room 30d and fifth room 30e.

Fifth room 30e has a fifth room label 31e, which identifies the nature of fifth room 30e and differentiates fifth room 30e from other rooms. Fifth room label 31e also includes the dimensions of fifth room 30e.

Fifth room 30e has a ninth measurement line 36i, which represents the length of fifth room 30e and can be located in the property overview image relative to the location at which the represented measurement was collected. Ninth measurement line label 37i indicates the numerical value of the measurement represented by ninth measurement line 36i.

Fifth room 30e further has a tenth measurement line 36j, which represents the width of fifth room 30e and can be located in the property overview image relative to the location at which the represented measurement was collected. Tenth measurement line label 37j indicates the numerical value of the measurement represented by tenth measurement line 36j.

Fifth room 30e also has a ninth wall interruption 38i, a tenth wall interruption 38j, an eleventh wall interruption 38k, and a twelfth wall interruption 38l. Ninth wall interruption 38i, tenth wall interruption 38j, eleventh wall interruption 38k, and twelfth wall interruption 38l are each depicted accommodating a window disposed between fifth room 30e and the exterior of structure 28.

Fifth room 30e also has twenty-first wall interruption 38u, depicted as a pass-through opening disposed between fourth room 30d and fifth room 30e. Fifth room 30e further has a twenty-second wall interruption 38v, depicted as a pass through opening disposed between fifth room 30e and sixth room 30f. A sixteenth measurement line 36p is also depicted in fifth room 30e, representing a measurement collected for the distance between twenty-second wall interruption 38v and an adjacent perpendicular wall of fifth room 30e.

Sixth room 30f has a sixth room label 31f, which indicates the nature of sixth room 30f and differentiates sixth room 30f from other rooms. Sixth room label 31f also includes the dimensions of sixth room 30f.

Sixth room 30f also has a stair tread 107, depicted between sixth room 30f and an adjacent space. Eighth room label 31h indicates the nature of the adjacent space as "Stairs."

Sixth room 30f has an eleventh measurement line 36k, which represents the length of sixth room 30f and can be located in the property overview image relative to the location at which the on-site measurement was collected. Eleventh measurement line label 37k indicates the numerical value of the measurement represented by eleventh measurement line 36k.

Sixth room 30f further has a twelfth measurement line 36l, which represents the distance from stair tread 107 to an opposing wall. Sixth room 30f has been conceptually separated for measurement and labeling purposes, such that the space beyond stair tread 107 is not represented by twelfth measurement line 36l. It is contemplated that multiple measurement lines can be collected, representing various room widths, allowing a single measurement line to be selectively displayed in an property overview image as the representative measurement for a room that has been conceptually separated.

Twelfth measurement line label 37*l* indicates the numerical value of the measurement represented by twelfth measurement line 36*l*.

Sixth room 30*f* has a thirteenth wall interruption 38*m*, and a fourteenth wall interruption 38*n*, each of which is depicted accommodating a window disposed between sixth room 30*f* and the exterior of structure 28. Sixth room 30*f* also has a twenty-third wall interruption 38*w*, which is depicted accommodating a door disposed between sixth room 30*f* and the exterior of structure 28.

Sixth room 30*f* has twenty-second wall interruption 38*v*, depicted accommodating a pass-through opening disposed between fifth room 30*e* and sixth room 30*f*. Sixth room 30*f* further has sixteenth wall interruption 38*p*, depicted accommodating a pass through opening disposed between first room 30*a* and sixth room 30*f*. Sixth room 30*f* also has wall interruption 38*z*, depicted as a pass through opening disposed between third room 30*c* and sixth room 30*f*.

Sixth room 30*f* has a twenty-fourth wall interruption 38*x*, depicted accommodating a door disposed between sixth room 30*f* and an additional space, having a fifth counter 104*e* and a seventh measurement line 36*q* which represents the distance between wall interruption 38*x* and an adjacent perpendicular wall. Eleventh room label 31*k* indicates the nature of this additional space.

Sixth room 30*f* also has a twenty-fifth wall interruption 38*y*, depicted accommodating a door disposed between sixth room 30*f* and an adjacent space. Twelfth room label 31*l* indicates the nature of this additional space.

Figure 6:
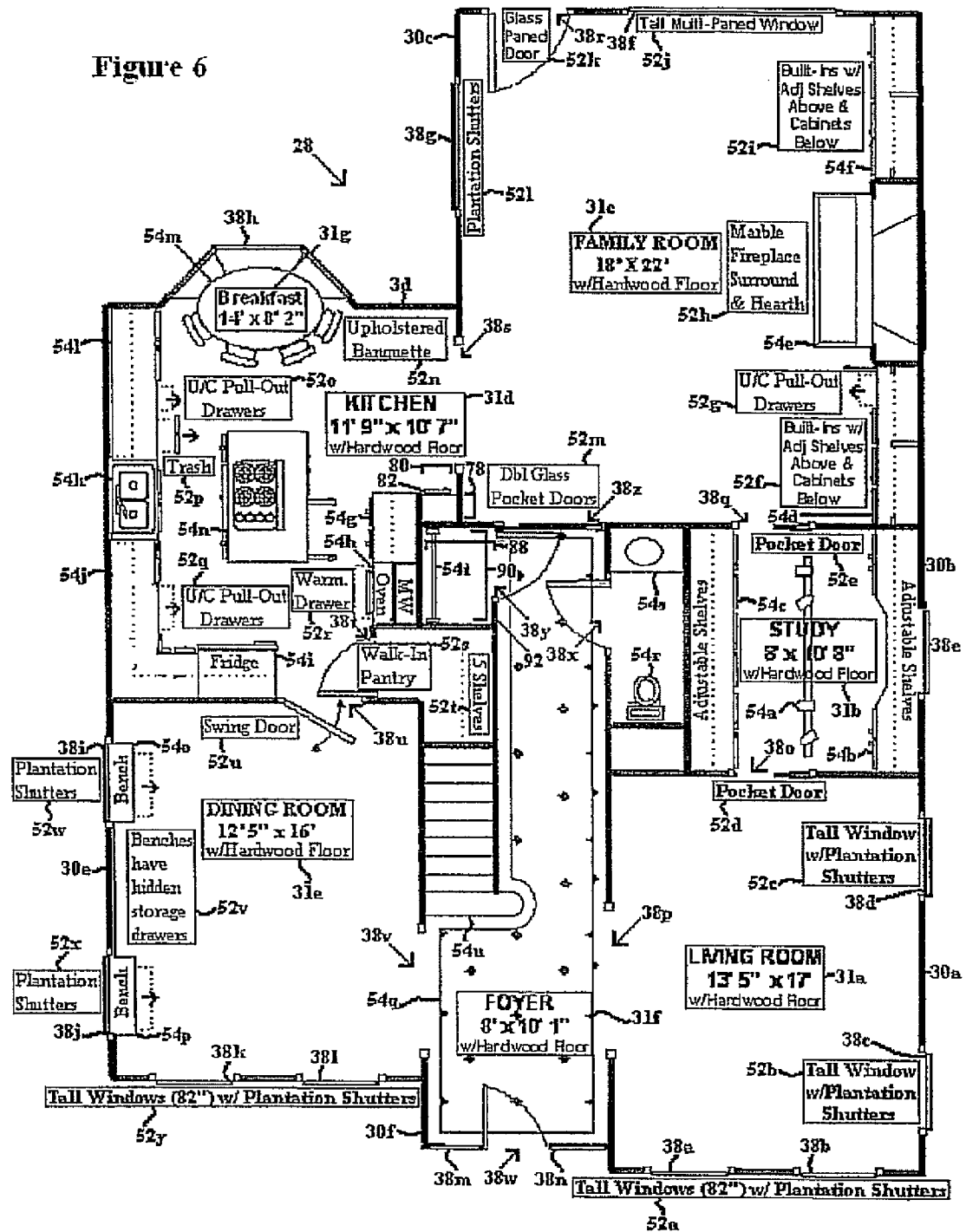
FIG. 6 depicts an embodiment an image displaying a floor plan of the first floor of a structure containing graphic images and icons produced using the present method.

Referring now to FIG. 6, an embodiment of a portion of a property overview image is depicted. FIG. 6 depicts a portion of an exemplary image produced after measuring a structure, inputting some related structural information such as graphic images and annotated text information, but before adding icons for linking to digital images. The portion of the image depicted in FIG. 6 is depicted in its entirety in FIG. 7. The portion of the image depicted in FIG. 6 depicts an enlarged view of the first floor of structure 28.

Structure 28 has six major rooms, first room 30*a*, second room 30*b*, third room 30*c*, fourth room 30*d*, fifth room 30*e*, and sixth room 30*f*.

First room 30*a* has a first room label 31*a*. First room label 31*a* identifies fist room 30*a* and differentiates first room 30*a* from other rooms. First room label 31*a* further includes the dimensions of first room 30*a*, and also includes additional text describing features of first room 30*a*, such as "Hardwood Floor."

First room 30*a* has first wall interruption 38*a*, and a second wall interruption 38*b*, each of which is depicted accommodating a window disposed between first room 30*a* and the exterior of structure 28. First text information 52*a* describes the windows accommodated by first wall interruption 38*a* and second wall interruption 38*b* using annotated text, such as "Tall Windows (82") w/ Plantation Shutters."

First room 30*a* also has third wall interruption 30*c*, which is depicted accommodating a window disposed between first room 30*a* and the exterior of structure 28. Second text information 52*b* describes the window accommodated by third wall interruption 30*c*. First room 30*a* further has fourth wall interruption 30*d*, depicted accommodating a window disposed between first room 30*a* and the exterior of structure 28. Third text information 52*c* describes the window accommodated by fourth wall interruption 30*d*.

First room also has fifteenth wall interruption 38*o*, which is depicted accommodating a pocket door disposed between first room 30*a* and second room 30*b*. Fourth text information 52*d* describes the door accommodated by fifteenth wall interruption 38*o*.

First room additionally has sixteenth wall interruption 38*p*, which is depicted accommodating a cased opening disposed between first room 30*a* and sixth room 30*f*.

Second room 30*b* has a second room label 31*b*, which identifies the nature of second room 30*b* and differentiates second room 30*b* from other rooms. Second room label 31*b* further includes the dimensions of second room 30*b*, and also includes additional text describing one or more features of second room 30*b*, such as "Hardwood Floor."

Second room 30*b* is depicted having first graphic image 54*a*, which represents a track lighting strip. While text information could be included to describe or identify graphic image 54*a* and similar graphic images, graphic image 54*a* is an easily recognized depiction and can be presented and recognized by a user without text information.

Second room 30*b* also has second graphic image 54*b* and third graphic image 54*c*. Second graphic image 54*b* and third graphic image 54*c* represent floor to ceiling built-in units having cabinet bases, drawers, and adjustable shelving. Second graphic image 54*b* and third graphic image 54*c* correspond to first built-in cabinet unit 100*a* and second adjustable cabinet unit 100*b*, respectively, depicted in FIG. 5. Second graphic image 54*b* and third graphic image 54*c* include lines depicting adjustable shelving, cabinets, and cabinet pulls, and annotated text information identifying the adjustable shelves.

Second room 30*b* has wall interruption 38*e*, depicted accommodating a window. Second room 30*b* further has fifteenth wall interruption 38*o*, depicted accommodating a pocket door. Fourth text information 52*d* describes the door accommodated by fifteenth wall interruption 38*o*. Second room 30*b* additionally has seventeenth wall interruption 38*q*, depicted accommodating a pocket door. Fifth text information 52*e* describes the door accommodated by sixteenth wall interruption 38*q*.

Third room 30*c* has a third room label 31*c*. Third room label 31*c* identifies third room 30*c* and differentiates third room 30*c* from other rooms. Third room label 31*c* also includes text indicating the dimensions of third room 30*c* and text describing one or more features of third room 30*c*, such as "Hardwood Floor."

Third room 30*c* is also depicted having a fourth graphic image 54*d* and a sixth graphic image 54*f*, which represent built-in shelves with cabinets. Fourth graphic image 54*d* and sixth graphic image 54*f* correspond to second built-in cabinet base 101*b* and first built-in cabinet base 101*a*, respectively, depicted in FIG. 5.

Fourth graphic image 54*d* and sixth graphic image 54*f* include lines depicting shelving, cabinets, and cabinet pulls. Fourth graphic image 54*d* further includes lines depicting under-counter pull-out drawers. Sixth text information 52*f* identifies and describes the built-in shelving and cabinetry represented by fourth graphic image 54*d*. Seventh text information 52*g* identifies and describes the under-counter pull-out drawers represented by fourth graphic image 54*d*. Ninth text information 52*i* identifies and describes the shelving and cabinetry represented by sixth graphic image 54*f*.

Third room 30*c* also has a fifth graphic image 54*e*, which represents a fireplace surround and hearth, the hearth being framed into the floor. Fifth graphic image 54*e* corresponds to fireplace 102, depicted in FIG. 5. Fifth graphic image 54*e* includes lines depicting a fireplace surround, a hearth, and depicting the framing of the hearth. Eighth text information 52h identifies and describes the fireplace surround, hearth, and framing represented by fifth graphic image 54e.

Third room 30c further has sixth wall interruption 38f, which is depicted accommodating a tall multi-paned window disposed between third room 30c and the exterior of structure 28. Tenth text information 52j identifies and describes the window accommodated by sixth wall interruption 38f.

Third room 30c also has seventh wall interruption 38g, which is depicted accommodating a window disposed between third room 30c and the exterior of structure 28. Twelfth text information 52l further describes the window accommodating seventh wall interruption 38g with annotated text, such as "Plantation Shutters."

Third room 30c has seventeenth wall interruption 38q, which is depicted accommodating a pocket door disposed between second room 30b and third room 30c. Fifth text information 52e identifies and describes the door accommodated by seventeenth wall interruption 38q.

Third room 30c additionally has eighteenth wall interruption 38r, which is depicted accommodating a glass paned door disposed between third room 30c and the exterior of structure 28. Eleventh text information 52k identifies and describes the door accommodated by eighteenth wall interruption 38r.

Third room 30c has nineteenth wall interruption 38s, depicted accommodating a cased opening disposed between third room 30c and fourth room 30d. Third room 30c also has twenty-sixth wall interruption 38z, depicted accommodating double glass pocket doors disposed between third room 30c and sixth room 30f. Thirteenth text information 52m identifies and describes the doors accommodated by twenty-sixth wall interruption 38z.

Fourth room 30d is a non-rectangular room, having an alcove, such as a breakfast alcove. Fourth room 30d has been conceptually divided into two rooms for measurement purposes and has two room labels, fourth room label 31d and seventh room label 31g.

Fourth room label 31d identifies the nature of fourth room 30d and differentiates fourth room 30d from other rooms. Fourth room label 31d further includes text indicating the dimensions of fourth room 30d and text describing one or more features of fourth room 30d, such as "Hardwood Floor."

Seventh room label 31g identifies the nature of the alcove disposed in fourth room 30d and includes text indicating the dimensions of the alcove disposed in fourth room 30d.

Fourth room 30d has a cabinet 82, which is depicted having a cabinet pull. Cabinet 82 has a cabinet length 78 and a cabinet width 80.

Fourth room 30d has seventh graphic image 54g, which represents a counter with drawers. Seventh graphic image 54g corresponds to third counter 104c, depicted in FIG. 5. Seventh graphic image 54g includes lines depicting shelving, counter space, drawers, and drawer pulls.

Fourth room 30d has eighth graphic image 54h, which represents an oven. Eighth graphic image 54h corresponds to oven 105, depicted in FIG. 5. Eighth graphic image 54h includes lines depicting a microwave, an oven, oven door, and a warming drawer, and annotated text identifying the microwave, such as "MW," and the oven. Eighteenth text information 52r identifies and describes the warming drawer depicted in eighth graphic image 54h.

Fourth room 30d has ninth graphic image 54i, which represents a refrigerator. Ninth graphic image 54i corresponds to refrigerator 103, depicted in FIG. 5. Ninth graphic image 54i includes lines depicting a refrigerator and annotated text information identifying the refrigerator, such as "Fridge."

Fourth room 30d further has tenth graphic image 54j and twelfth graphic image 54l, which represent counters. Tenth graphic image 54j and twelfth graphic image 54l correspond to second counter 104b and first counter 104a, respectively, depicted in FIG. 5.

Tenth graphic image 54j and twelfth graphic image 54l include lines depicting shelving, counter space, cabinetry, cabinet pulls, drawers, drawer pulls, and under-counter pull-out drawers. Twelfth graphic image 54l also includes lines depicting an under-counter pull-out trash slide. Seventeenth text information 52q identifies and describes the under-counter pull-out drawers represented in tenth graphic image 54j. Sixteenth text information 52p identifies and describes the under-counter pull-out trash slide represented in twelfth graphic image 54l. Fifteenth text information 52o identifies and describes the under-counter pull-out drawers represented in twelfth graphic image 54l.

Fourth room 30d also has thirteenth graphic image 54m, which represents a table and chairs adjacent to built-in bench seating within the alcove. Fourteenth text information 52n identifies and describes the table, chairs, and built-in seating represented by thirteenth graphic image 54m with annotated text information, such as "Upholstered Banquette."

Fourth room 30d further has fourteenth graphic image 54n, which represents a free-standing kitchen island having a cook top. Fourteenth graphic image 54n corresponds to fourth counter 104d, depicted in FIG. 5. Fourteenth graphic image 54n has lines depicting cabinetry, drawers, cabinet pulls, drawer pulls, and a graphic depiction of a cook top.

Fourth room 30d has eighth wall interruption 38h, which is depicted accommodating three windows surrounding an alcove, disposed between fourth room 30d and the exterior of structure 28. Fourth room 30d also has nineteenth wall interruption 38s, depicted accommodating a cased opening disposed between third room 30c and fourth room 30d.

Fourth room 30d further has twentieth wall interruption 38t, depicted accommodating a door disposed between fourth room 30d and an additional space. Nineteenth text information 52s identifies and describes the additional space with annotated text, such as "Walk-In Pantry." Twentieth text information 52t identifies and describes one or more features of the additional space identified and described by nineteenth text information 52s, using annotated text, such as "5 Shelves."

Fourth room 30d additionally has twenty-first wall interruption 38u, which is depicted accommodating a swing door disposed between fourth room 30d and fifth room 30e. Twenty-first text information 52u identifies and describes the door accommodated by twenty-first wall interruption 38u.

Fifth room 30e has a fifth room label 31e, which identifies the nature of fifth room 30e and differentiates fifth room 30e from other rooms. Fifth room label 31e also includes text indicating the dimensions of fifth room 30e and text identifying and describing one or more features of fifth room 30e, such as "Hardwood Floor."

Fifth room 30e has fifteenth graphic image 54o and sixteenth graphic image 54p, which represent benches having storage drawers. Fifteenth graphic image 54o and sixteenth graphic image 54p include lines depicting benches and storage drawers, and annotated text identifying the benches depicted by fifteenth graphic image 5ro and sixteenth graphic image 54p.

Twenty-second text information 52v identifies and further describes the storage drawers represented by fifteenth graphic image 54o and sixteenth graphic image 54p.

Fifth room 30e also has ninth wall interruption 38i and tenth wall interruption 38j, which are each depicted accommodating a window disposed between fifth room 30e and the exterior of structure 28. Twenty-third text information 52w further describes the window accommodated by ninth wall interruption 38i with annotated text, such as "Plantation Shutters." Twenty-fourth text information 52x similarly describes the window accommodated by tenth wall interruption 38j.

Fifth room 30e further has eleventh wall interruption 38k and twelfth wall interruption 38l, which are each depicted accommodating a window disposed between fifth room 30e and the exterior of structure 28. Twenty-fifth text information 52y further describes the windows accommodated by eleventh wall interruption 38k and twelfth wall interruption 38l with annotated text, such as "Tall Windows (82") w/ Plantation Shutters."

Fifth room 30e additionally has twenty-first wall interruption 38u, which is depicted accommodating a swing door disposed between fourth room 30d and fifth room 30e. Twenty-first text information 52u identifies and describes the door accommodated by twenty-first wall interruption 38u.

Fifth room 30e has twenty-second wall interruption 38v, which is depicted accommodating a cased opening disposed between fifth room 30e and sixth room 30f.

Sixth room 30f has a sixth room label 31f, which identifies the nature of sixth room 30f and differentiates sixth room 30f from other rooms. Sixth room label 31f further has text indicating the dimensions of sixth room 30f and text describing one or more features of sixth room 30f, such as "Hardwood Floor."

Sixth room 30f is depicted having a seventeenth graphic image 54q, which represents a patterned or textured floor. Sixth room 30f is also depicted having a twenty-first graphic image 54u, which represents a stairway. Twenty-first graphic image 54u corresponds to stair tread 107 and eighth room label 31h, depicted in FIG. 5. Twenty-first graphic image 54u also depicts the design and relation of the border of the flooring represented by seventeenth graphic image 54q to the stair tread represented by twenty-first graphic image 54u. The contrasting inlaid wood border of the hardwood floor represented by seventeenth graphic image 54q is shown encircling the arc shape of the bottom stair tread represented in twenty-first graphic image 54u.

Sixth room 30f has thirteenth wall interruption 38m and fourteenth wall interruption 38n, which are each depicted accommodating a window disposed between sixth room 30f and the exterior of structure 28. Sixth room 30f also has twenty-third wall interruption 38w, which is depicted accommodating a door disposed between sixth room 30f and the exterior of structure 28.

Sixth room 30f has twenty-fourth wall interruption 38x, which is depicted accommodating a door disposed between sixth room 30f and an additional space having eighteenth graphic image 54r and nineteenth graphic image 54s. Eighteenth graphic image 54r represents a toilet. Nineteenth graphic image 54s represents a sink and counter. Nineteenth graphic image 54s corresponds to fifth counter 104e, depicted in FIG. 5.

Sixth room 30f has twenty-fifth wall interruption 38y, which is depicted accommodating a door disposed between sixth room 30f and a closet 92. Closet 92 has a closet length 88 and a closet width 90. Closet 92 also has twentieth graphic image 54t, which represents a closet bar for hanging clothing.

Sixth room 30f also has twenty-sixth wall interruption 38z, which is depicted accommodating double glass pocket doors disposed between third room 30c and sixth room 30f. Thirteenth text information 52m describes the doors accommodated by twenty-sixth wall interruption 38z.

Figure 7:
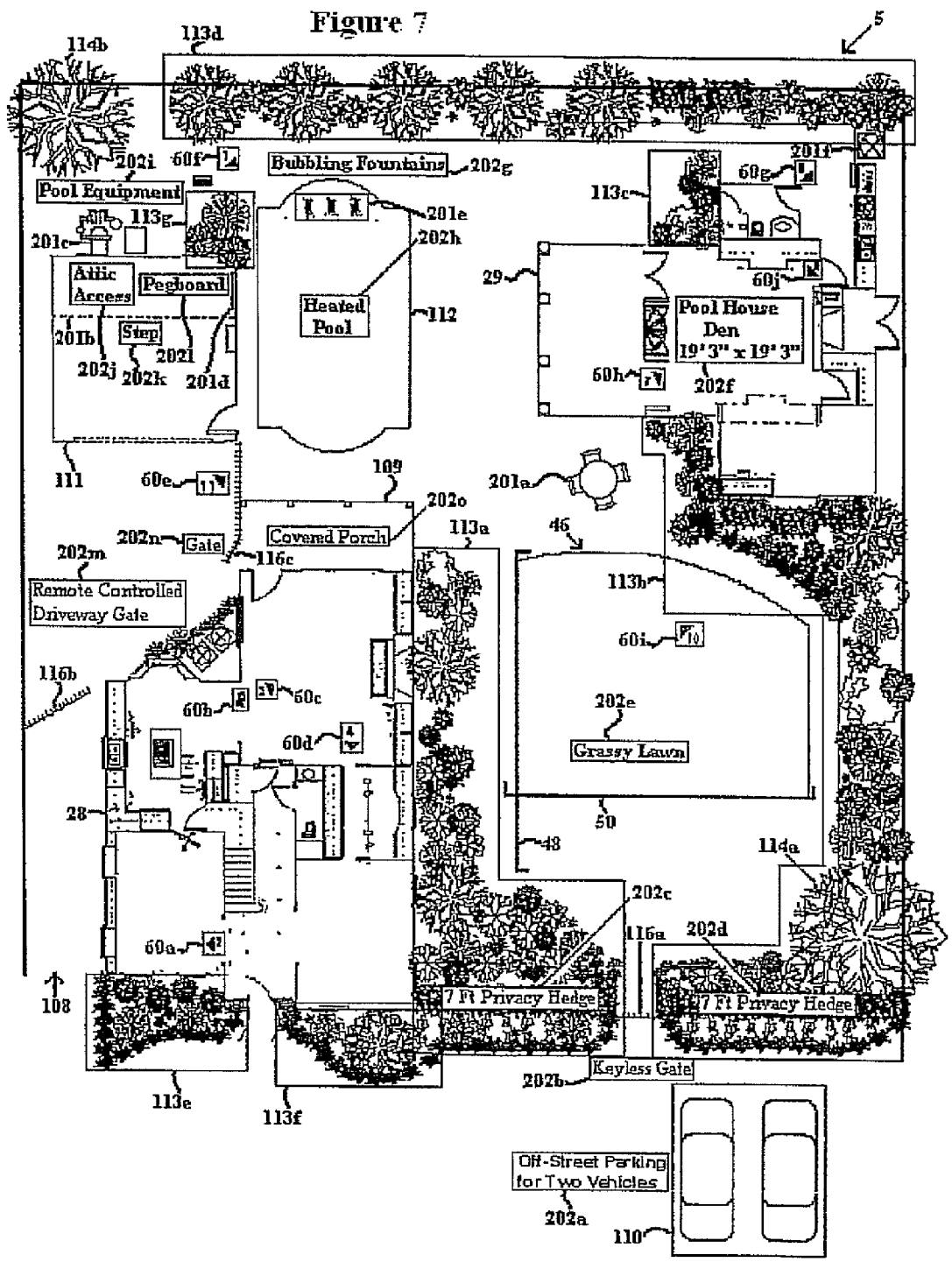
FIG. 7 depicts an embodiment of the image displayed in FIG. 6, further depicting both the first floor of the structure and the outside space adjacent to the structure.

Referring now to FIG. 7, an embodiment of a property overview image is depicted, which includes not only the first floor of structure 28, but also multiple outside spaces. It is contemplated that a user will be able to magnify and reduce the property overview image as needed, such as using computer software such as Adobe Acrobat, to view the detail depicted by FIG. 6 that is not depicted in FIG. 7.

FIG. 7 depicts a property 5, on which structure 28 is located. FIG. 7 depicts the first floor of structure 28 and numerous outside spaces adjacent to structure 28, including outside space 46, which is a grassy lawn, second structure 29, which is a pool house, pool 112, garage 111, driveway 108, covered porch 109, and off-street parking 110.

Structure 28 can include text information, graphic images, room labels, and wall interruptions, similar to those depicted in FIG. 6, which can be viewed by a user through enlarging the image depicted in FIG. 7. It is contemplated that the floor plan depicted in FIG. 6 can be nested within the property overview image of FIG. 7, such that a user can link to the floor plan of FIG. 6 by selecting a link within the property overview image of FIG. 7.

Structure 28 includes four icons, first icon 60a, second icon 60b, third icon 60c, and fourth icon 60d.

First icon 60a, second icon 60b, third icon 60c, and fourth icon 60d can be any shape or size, and can include any character or symbol. FIG. 7 depicts first icon 60a, second icon 60b, third icon 60c, and fourth icon 60d as triangles labeled with a numeral. First icon 60a, second icon 60b, third icon 60c, and fourth icon 60d can be located in the property overview image relative to the location in which a digital image, such as a photograph, was taken. Further, first icon 60a, second icon 60b, third icon 60c, and fourth icon 60d can also indicate the direction and perspective of the digital image represented by the respective icon, such as by including a triangle which points in the direction in which the digital image was taken.

Figure 8:
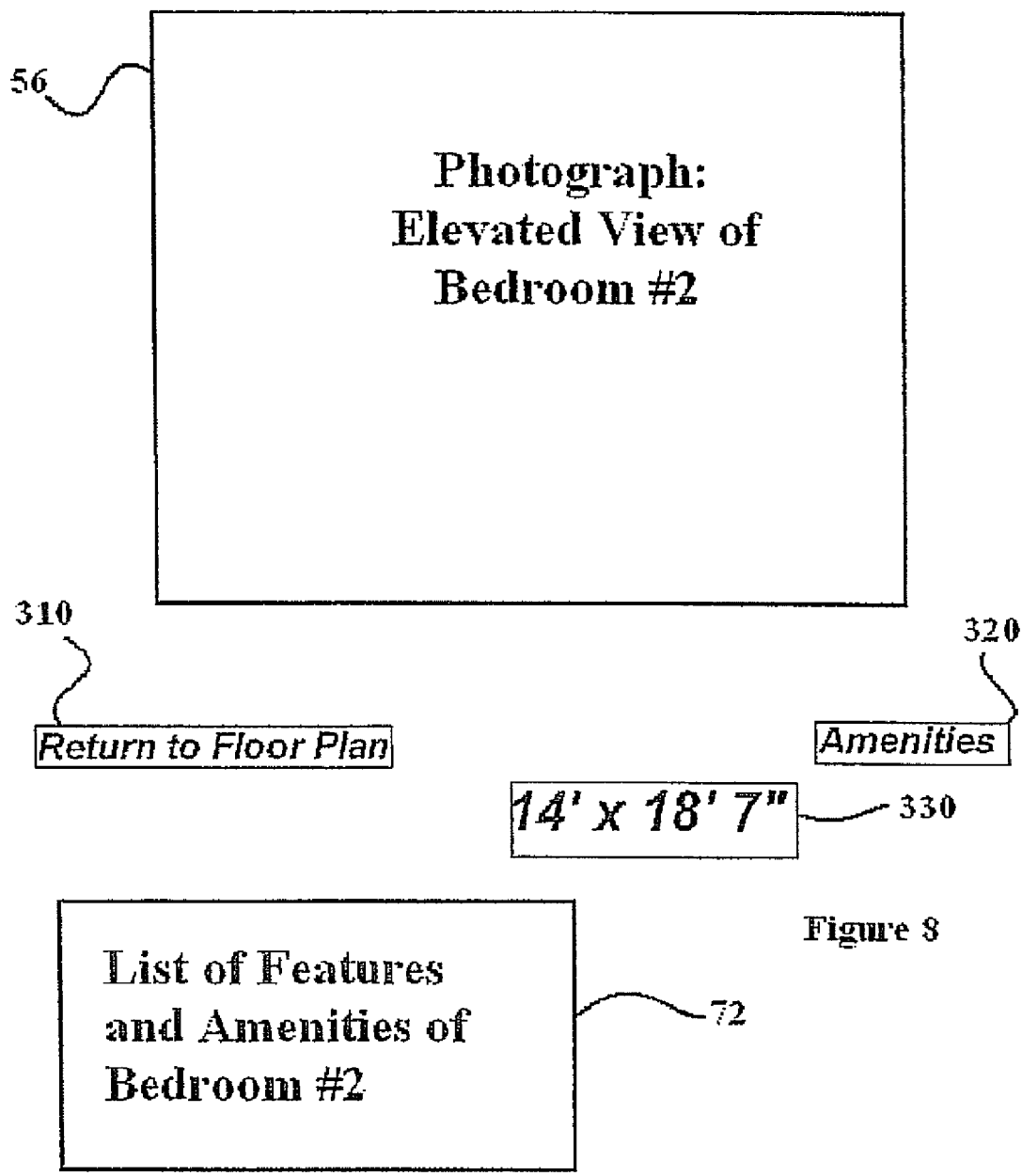
FIG. 8 depicts an embodiment of a display showing a digital image of part of a structure and text information relating to that part of the structure.

It is contemplated that a user can access first icon 60a, second icon 60b, third icon 60c, and fourth icon 60d, such as by using a mouse, a keyboard, a touchpad, or a stylus to view the digital image represented by the respective icon in a display similar to that depicted in FIG. 8.

FIG. 7 depicts fifth landscape image 113e and sixth landscape image 113f disposed adjacent to structure 28. Fifth landscape image 113e and sixth landscape image 113f are graphic images including lines and shapes to depict and represent bushes, shrubs, grasses, and other plants. Fifth landscape image 113e and sixth landscape image 113f can accurately depict the shape, dimensions, and contents of the represented landscape features, including the type of foliage, the positioning of major and minor plantings such as hedges and trees, and the arrangement of various plants.

Driveway 108 is also disposed adjacent to structure 28. Driveway 108 has a second gate 116b. Second gate 116b is a graphic image including lines depicting a gate. Thirteenth text information 202m describes second gate 116b with annotated text, such as "Remote Controlled Driveway Gate." Covered porch 109 is also disposed adjacent to structure 28. Fifteenth text information 202o identifies and describes covered porch 109.

Third gate 116c is disposed adjacent to covered porch 109. Third gate 116c is a graphic image including lines depicting a gate and an attached fence. Fourteenth text information 202n identifies and describes third gate 116c.

Outside space 46 is disposed adjacent to structure 28 within property 5. Outside space 46 represents a grassy lawn. Outside space 46 has an outside space length 48 and an outside space width 50. Fifth text information 202e identifies and describes outside space 46 with annotated text, such as "Grassy Lawn."

First landscape image 113a and second landscape image 113b are disposed adjacent to outside space 46. First landscape image 113d and second landscape image 113b are graphic images that include shapes and lines depicting bushes, grasses, shrubs, a privacy hedge, and other plants. Second landscape image 113b further includes a first tree 114a, which is a graphic image including lines depicting branches and a trunk.

Third text information 202c identifies and describes the privacy hedge depicted by first landscape image 113a with annotated text, such as "7 Ft Privacy Hedge." Fourth text information 202d similarly identifies and describes the privacy hedge depicted by second landscape image 113b.

Outside space 46 has a ninth icon 60i, which can be any shape or size and any character or symbol. Ninth icon 60i is depicted as a triangle with a numerical label. Ninth icon 60i represents a digital image. It is contemplated that ninth icon 60i can be located in the property overview image relative to the location in property 5 where the represented digital image was taken. Ninth icon 60i can also indicate the direction and perspective of the represented digital image, such as including a triangle which points in the direction in which the digital image was taken.

It is contemplated that accessing ninth icon 60i, such as by using a keyboard, a mouse, a touchpad, or a stylus will cause the digital image represented by ninth icon 60i to be displayed, such as in a display similar to that shown in FIG. 8.

First graphic image 201a is disposed adjacent to outside space 46. First graphic image 201a represents a table and chairs and includes lines and shapes to depict the table and chairs.

FIG. 7 also depicts a second structure 29, disposed on property 5 adjacent to outside space 46. Second structure 29 is depicted as a pool house. It is contemplated that second structure 29 can include text information, graphic images, room labels, wall interruptions, and other features such as those present in structure 28, depicted in FIG. 6. A user can magnify the image depicted in FIG. 7 to better view the detail present in second structure 29.

Second structure 29 has sixth text information 202f, which identifies and describes a room within second structure 29 using annotated text, such as "Pool House Den 19' 3"×19' 3"."

Second structure 29 also has a seventh icon 60g, an eighth icon 60h, and a tenth icon 60j. Seventh icon 60g, eighth icon 60h, and tenth icon 60j can be any shape or size or any character or symbol, but are depicted in FIG. 7 as triangles having a numerical label. Seventh icon 60g, eighth icon 60h, and tenth icon 60j each represent a digital image of a portion of second structure 29.

It is contemplated that seventh icon 60g, eighth icon 60h, and tenth icon 60j can be located in the property overview image relative to the location within property 5 where each represented digital image was collected. It is also contemplated that seventh icon 60g, eighth icon 60h, and tenth icon 60j can indicate the direction and perspective of the represented digital image, such as by including a triangle which points in the direction in which the digital image was taken.

It is further contemplated that a user can access seventh icon 60g, eighth icon 60h, and tenth icon 60j, such as using a mouse, a keyboard, a touchpad, or a stylus to display the digital image represented by the accessed icon, such as in a display similar to that depicted in FIG. 8.

Second structure 29 also has third landscape image 113c and fourth landscape image 114d disposed adjacent to second structure 29. Third landscape image 113c and fourth landscape image 114d are graphic images that include lines and shapes depicting bushes, grasses, shrubs, and other plants. Fourth landscape image 113d further includes lines and shapes representing trees. Third landscape image 113c and fourth landscape image 113d can accurately depict the shape, dimensions, and contents of the represented landscape features, including the type of foliage, the positioning of major and minor plantings such as hedges and trees, and the arrangement of various plants.

Sixth graphic image 201f is disposed adjacent to second structure 29. Sixth graphic image 201f represents an air conditioning unit and includes lines and shapes to depict an air conditioning unit.

FIG. 7 also depicts garage 111, disposed adjacent to structure 28 and driveway 108. Garage 111 has second graphic image 201b, which represents a step. Eleventh text information 202k identifies and describes the step represented by second graphic image 201b. Garage 111 further has fourth graphic image 201d, which represents pegboard. Twelfth text information 202l identifies and describes the pegboard represented by fourth graphic image 201d.

Garage 111 also has tenth text information 202j, which identifies the existence of attic access in garage 111 using annotated text, such as "Attic Access."

Third graphic image 201c is disposed adjacent to garage 111. Third graphic image 201c represents pool equipment, and includes lines and shapes depicting pool equipment. Eleventh text information 202i identifies and describes the pool equipment represented by third graphic image 201c.

Seventh landscape image 113g is also disposed adjacent to garage 111. Seventh landscape image 113g is a graphic image including lines and shapes depicting bushes, shrubs, grasses, and other plants. Seventh landscape image 113g can accurately depict the shape, dimensions, and contents of the represented landscape features, including the type of foliage, the positioning of major and minor plantings such as hedges and trees, and the arrangement of various plants. Second tree 114b is also disposed adjacent to garage 111. Second tree 114b is a graphic image including lines and shapes depicting branches and a trunk. The positioning and size of second tree 114b can accurately depict the position and size of the tree represented by second tree 114b.

Pool 112 is depicted adjacent to garage 111, covered porch 119, and second structure 29. Eighth text information 202h describes and identifies pool 112 with annotated text, such as "Heated Pool." Fifth graphic image 201e is disposed in pool 112. Fifth graphic image 201e represents fountains and includes lines and shapes depicting fountains. Seventh text information 202g identifies and describes the fountains represented by fifth graphic image 201e using annotated text, such as "Bubbling Fountains."

Fifth icon 60e and sixth icon 60f are disposed adjacent to pool 112. Fifth icon 60e and sixth icon 60f can be any size or shape and any character or symbol, but are each depicted as a triangle with a numeric label. Fifth icon 60e and sixth icon 60f each represent a digital image and can be located in the property overview image relative to the location in property 5 where the represented digital image was taken.

It is contemplated that fifth icon 60e and sixth icon 60f can also indicate the direction and perspective of the represented digital image, such as by including a triangle which points in the direction in which the digital image was taken. It is further contemplated that a user can access fifth icon 60e and sixth icon 60f, such as by using a keyboard, a mouse, a touchpad, or a stylus to display the represented digital image in a display similar to that depicted in FIG. 8.

FIG. 7 additionally depicts off-street parking 110. Off-street parking 110 is a graphic image including lines and shapes depicting a parking area and two vehicles. First text information 202a identifies and describes off-street parking 110 with annotated text, such as "Off-Street Parking for Two Vehicles."

Referring now to FIG. 8, an embodiment of a display including a digital image and related text information is depicted. It is contemplated that a display similar to that depicted in FIG. 8 can be accessed through any of the icons 60a-60j, such as by using a mouse, a keyboard, a touchpad, or a stylus.

FIG. 8 includes a digital image 56. Digital image 56 can be any kind of image, including a digital photograph, a tape, a video, an online digital representation, or other images or mediums of display. Digital image 56 can be of any portion of a structure, such as structure 28, including interior rooms and exterior views. Digital image 56 can also be of any space outside or adjacent to a structure or a property, such as property 5. Digital image 56 can also have any perspective. Digital image 56 can also be of any view or perspective from the structure or property, such as view from a balcony, or a skyline as seen from the structure or property.

Digital image 56 is a digital image represented by the icon that was accessed to cause the display depicted in FIG. 8 to be displayed. FIG. 8 also depicts a digital image label 300, which includes text information describing the contents of Digital image 56. Digital image label 300 can identify the street address of the structure in which the digital image was taken, the room within the structure, or other relevant information.

FIG. 8 further depicts a dimension label 330, which can describe the dimensions of a room that is depicted by digital image 56. FIG. 8 also depicts a features listing 72, which includes text information describing the features, amenities, benefits, contents, materials, and structural characteristics of the room or space depicted by digital image 56.

FIG. 8 also includes a floor plan link 310 and an amenities link 320. It is contemplated that by accessing floor plan link 310, such as by using a mouse, a keyboard, a touchpad, or a stylus, a user can cause the property overview image, similar to the image depicted in FIG. 7, to be displayed. It is contemplated that by accessing the amenities link 320, a user can cause a full features listing relating to the structure to be displayed, such as that depicted in FIG. 9. It is also contemplated that an property overview image can be separated into multiple parts, such as when the file size of a single property overview image exceeds that permitted by many real estate databases. A display similar to that depicted in FIG. 8 could have multiple floor plan links for linking to each part of the property overview image. It is further contemplated that multiple floor plan links could be included for linking to different stories of a multiple-story structure. In an embodiment, the display could also have one or more links for adding, removing, and/or arranging furniture and landscaping icons within the property overview image.

Referring now to FIG. 9, an embodiment of a portion of a features listing relating to a structure, such as structure 28, is depicted. It is contemplated that a features listing such as that depicted in FIG. 9 can be accessed using an amenities link such as that depicted in FIG. 8. While the features listing depicted in FIG. 9 is only a partial features listing, it is contemplated that a full features listing can contain information pertaining to every room within a structure and one or more outside spaces adjacent to a structure. It is also contemplated that a features listing such as that depicted in FIG. 9 can include a property overview image that is sized and formatted so that the property overview image can be printed using a printer.

FIG. 9 includes a features listing label 350. Features listing label 350 can include information identifying the structure or property, such as a street address or other information. Features listing label 350 can also include information identifying the contents of the features listing depicted in FIG. 9.

FIG. 9 also includes first room label 360a, second room label 360b, a third room label 360c, and a fourth room label 360d. First room label 360a, second room label 360b, third room label 360c, and fourth room label 360d each identify a room within a structure and differentiate the identified room from other rooms.

FIG. 9 also depicts a first dimension label 330a, a second dimension label 330b, a third dimension label 330c, and a fourth dimension label 330d. First dimension label 330a indicates the dimensions of the room referenced by first room label 360a. Second dimension label 330b indicates the dimensions of the room referenced by second room label 360b. Third dimension label 330c indicates the dimensions of the room referenced by third room label 360c. Fourth dimension label 330d indicates the dimensions of the room referenced by fourth room label 360d.

FIG. 9 further depicts a first features listing 72a, a second features listing 72b, a third features listing 72c, and a fourth features listing 72d. First features listing 72a describes and identifies one or more features, amenities, benefits, contents, and structural characteristics present in the room identified by first room label 360a. Second features listing 72b describes and identifies one or more features, amenities, benefits, contents, and structural characteristics present in the room identified by second room label 360b. Third features listing 72c describes and identifies one or more features, amenities, benefits, contents, and structural characteristics present in the room identified by third room label 360c. Fourth features listing 72d describes and identifies one or more features, amenities, benefits, contents, and structural characteristics present in the room identified by fourth room label 360d.

In the exemplary partial features listing depicted in FIG. 9, first room label 360a, first dimension label 330a, and first text information 72a correspond to sixth room 30f, depicted in FIG. 6. Second room label 360b, second dimension label 330b, and second text information 72b correspond to first room 30a, depicted in FIG. 6. Third room label 360c, third dimension label 330c, and third text information 72c correspond to fourth room 30d, depicted in FIG. 6. Fourth room label 360d, fourth dimension label 330d, and fourth text information 72d correspond to the alcove portion of fourth room 30d, indicated by seventh room label 31g, depicted in FIG. 6.

The partial features listing depicted in FIG. 9 also includes a first floor plan link 310a and a second floor plan link 310b. A user can access first floor plan link 310a or second floor plan link 310b, such as using a mouse, a keyboard, a touchpad, or a stylus, to cause a property overview image relating to the structure to be displayed, similar to the floor plan depicted in FIG. 6.

While these embodiments have been described with emphasis on the embodiments, it should be understood that within the scope of the appended claims, the embodiments might be practiced other than as specifically described herein.

What is claimed is:

1. A method for forming an interactive image of a property, the method comprising the steps of:

determining at least a first measurement of a space within the property forming at least one measurement line, wherein the space is an indoor space, an outdoor space, or combinations thereof, wherein the space comprises a plurality of points, and wherein the at least first measurement is a distance between a first point and a second point of the plurality of points;

inputting the at least first measurement to a processor having data storage;

inputting textual information concerning the space and at least one graphic image concerning the space to the processor;

forming a property overview image of the space using computer instructions in the data storage, the at least first measurement, the at least one measurement line, the textual information, and the at least one graphic image; and outputting the property overview image for viewing by a user.

2. The method of claim 1, further comprising the steps of:
obtaining at least one digital image of the space and inputting the at least one digital image to the processor;
placing at least one icon on the property overview image; and
linking the at least one icon to the at least one digital image.

3. The method of claim 1, wherein the step of determining the at least first measurement is performed using a manual measuring tool, an electronic measuring tool, a digital measuring tool, or combinations thereof.

4. The method of claim 1, wherein the step of determining the at least first measurement is performed by obtaining a satellite image of the space and determining the at least first measurement using the satellite image.

5. The method of claim 1, wherein the at least first measurement is a length of the space, a width of the space, a height of the space, or combinations thereof.

6. The method of claim 1, wherein the indoor space is selected from the group consisting of: a structure, a room within a structure, a wall interruption within a room, a cabinet, a closet, and combinations thereof, and wherein the outdoor space is selected from the group consisting of: a yard, a pasture, a field, farmland, a road, a river, a forest, a ranch, open land, a body of water, an outdoor structure, and combinations thereof.

7. The method of claim 1, wherein the step of determining the at least first measurement forms a plurality of measurement lines relating to the at least first measurement.

8. The method of claim 7, further comprising selecting at least a first measurement line of the plurality of measurement lines that best represents the at least first measurement of the space.

9. The method of claim 1, wherein the textual information comprises a features listing of the space.

10. The method of claim 9, wherein the at least one graphic image is a drawing, an icon, a logo, a clip art, a symbol, or combinations thereof.

11. The method of claim 10, wherein the at least one graphic image corresponds to at least one feature listed in the features listing.

12. The method of claim 1, wherein the at least one digital image is a digital image of the space from one of a plurality of perspectives.

13. The method of claim 1, wherein the at least one digital image is a satellite image of the space.

14. The method of claim 2, wherein the step of obtaining the at least one digital image of the space is performed by photographing the space, videoing the space, drawing the space, obtaining a satellite image of the space, or combinations thereof.

15. The method of claim 1, wherein the step of outputting the property overview image for viewing is performed by displaying the property overview image on a display in communication with the processor, printing the property overview image on a printer in communication with the processor, transmitting the property overview image to the user over a network, or combinations thereof.

16. The method of claim 1, further comprising the step of using computer instructions to permit the user to magnify the property overview image, shrink the property overview image, or combinations thereof.

17. The method of claim 1, further comprising the step of using computer instructions to permit the user to add at least one furniture icon to the property overview image.

18. The method of claim 17, further comprising the step of using computer instructions to permit the user to move the at least one furniture icon within the property overview image, rotate the at least one furniture icon, caption the at least one furniture icon, enlarge the at least one furniture icon, shrink the at least one furniture icon, delete the at least one furniture icon, or combinations thereof.

19. The method of claim 1, further comprising the step of using computer instructions to permit the user to add at least one wall to the property overview image, remove at least one wall from the property overview image, or combinations thereof.

20. The method of claim 1, further comprising the step of locating at least one outlet in the space and depicting the at least one outlet in the property overview image.

* * * * *